US012681175B2

(12) United States Patent
Feng et al.

(10) Patent No.: US 12,681,175 B2
(45) Date of Patent: Jul. 14, 2026

(54) METHOD FOR SIMULTANEOUSLY MEASURING MULTI DOF GEs BY LASER AND SYSTEM THEREFOR

(71) Applicant: BEIJING JIAOTONG UNIVERSITY, Beijing (CN)

(72) Inventors: Qibo Feng, Beijing (CN); Fajia Zheng, Beijing (CN); Jiakun Li, Beijing (CN); Bin Zhang, Beijing (CN); Jing Yang, Beijing (CN); Yuqiong Zhao, Beijing (CN); Peizhi Jia, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 920 days.

(21) Appl. No.: 17/982,243

(22) Filed: Nov. 7, 2022

(65) Prior Publication Data

US 2023/0152452 A1     May 18, 2023

(30) Foreign Application Priority Data

Nov. 12, 2021    (CN) ........................... 202111338711.6

(51) Int. Cl.
*G01S 17/08* (2006.01)
*G01S 7/499* (2006.01)

(52) U.S. Cl.
CPC .............. *G01S 17/08* (2013.01); *G01S 7/499* (2013.01)

(58) Field of Classification Search
CPC ........ G01S 17/08; G01S 7/499; G01S 7/4917; G01S 17/36; G01B 9/02017; G01B 9/02029; G01B 2290/15; G01B 11/002; G01B 11/26; G01B 2290/70; G01B 11/161
See application file for complete search history.

(56) References Cited

U.S. PATENT DOCUMENTS

| | | | | |
|---|---|---|---|---|
| 6,049,377 A * | 4/2000 | Lau | ........................ | G01B 11/26 356/73 |
| 2003/0030816 A1* | 2/2003 | Eom | .................. | G01B 9/02081 356/486 |
| 2017/0167849 A1* | 6/2017 | Feng | .................. | G01B 9/02029 |
| 2017/0314916 A1 | 11/2017 | Feng et al. | | |
| 2019/0063910 A1* | 2/2019 | Feng | .................... | G01B 11/002 |

* cited by examiner

*Primary Examiner* — Yuqing Xiao
*Assistant Examiner* — Jempson Noel
(74) *Attorney, Agent, or Firm* — Makoui Law, PC; Ali Makoui

(57) ABSTRACT

A method and system for simultaneously measuring multiple DOF GEs by a laser. The system comprises a measuring unit and a target mirror unit; the measuring unit comprises a laser emitting module, a polarizing beam splitter, a fixed reflector, a first λ/4 wave plate, a second λ/4 wave plate, a first polarizer, a first photodetector, an interference length measuring module and a 2D angle measuring module. The target mirror unit comprises a beam splitter and a reflector. The laser emitting module generates an emitting light L1. The polarizing beam splitter is used for (1) beam splitting, (2) beam combining, and (3) beam separating. The fixed reflector is used for reflecting backward the reference light L12 propagating only inside the measuring unit to return the reference light L12 to the polarizing beam splitter. The present invention can realize a simultaneous and rapid measurement of 5/6DOF GEs of a space object moving linearly along a linear axis; and a relative drift of position and attitude of two objects with 5/6DOF in a space can be longtime monitored.

16 Claims, 13 Drawing Sheets

METHOD FOR SIMULTANEOUSLY MEASURING MULTI DOF GEs BY LASER AND SYSTEM THEREFOR

FIELD OF THE INVENTION

The present invention relates to technical field of optical precision measurement, in particular to a method for simultaneously measuring multiple DOF (degree of freedom) GEs by a laser, and a system therefor.

PRIOR ART

With development of precisely manufacturing, machining and assembling technology, a measuring accuracy of 6DOF GEs of an object in motion or that of 6DOF GEs of an object at rest must be higher and higher.

In prior art, a method for measuring 6DOF GEs is performed to use a laser interferometer, which is for a single parameter measurement. One degree error must be measured each time of installing and adjusting. Different types of accessories for measuring and repeatedly adjusting the interferometer are required for each measuring process.

In prior art, a method for measuring the above-mentioned 6DOF GEs has such disadvantages that an optical path structure is complex, and multiple detectors are used to measure different errors, which increases a system cost and complexity, makes a measuring time long, and makes measuring accuracy greatly affected by environmental changes. At the same time, an instability of the optical path structure caused by a circuit heat dissipation is increased, leading to a measuring error. Therefore, it is necessary to use as few optical components and detectors as possible to simultaneously measuring multi DOF GEs (geometric errors).

SUMMARY OF THE INVENTION

Embodiments of the present invention provide a method and a system for simultaneously measuring multiple DOF GEs by a laser, so as to overcome the problems in prior art.

In order to achieve the above object, the present invention adopts the following technical solutions.

According to one aspect of the present invention, there is provided a system for simultaneously measuring multiple DOF GEs by a laser, the system comprises a measuring unit and a target mirror unit; the measuring unit comprises a laser emitting module, a polarizing beam splitter, a fixed reflector, a first quarter-wave plate, a second quarter-wave plate, a first polarizer, a first photodetector, an interference length measuring module, and a 2D (two-dimensional) angle measuring module; the target mirror unit comprises a beam splitter and a reflector.

The laser emitting module is used to generate an emitting light L1.

The polarizing beam splitter is used for: (1) beam splitting: splitting the emitting light L1 into a measuring light L11 and a reference light L12. The measuring light L11 is to hit on the target mirror unit, transmitted by the beam splitter of the target mirror unit, and reflected back by the reflector as a light L111, which carries a 3DOF LGEs signal back to the measuring unit as a linear GE measuring light. The reference light L12 only propagates inside the measurement unit; (2) beam combining: transmitting or reflecting the reference light L12 that passes by the polarizing beam splitter again and the measuring light L111 that is reflected back 180° toward its original direction by the target mirror unit according to their polarizing status, so as to make the two beams superposed together in a spatial position, so as to form a combined light L3; (3) beam separating: separating a light L112 reflected by the beam splitter in the target mirror unit from the measuring light L11 as a two-dimensional angle measuring light, and the light L112 is transmitted or reflected by the polarizing beam splitter according to its polarization status.

The fixed reflector is used for reflecting backward the reference light L12 propagating only inside the measuring unit, so as to make the reference light L12 return to the polarizing beam splitter.

The first quarter-wave plate is used to change a polarizing direction of the reference light L12, so that when the reference light L12 passes by the polarizing beam splitter again, a transmitting or reflecting status is switched, that is, the reference light L12 is reflected at a first passing by, but is transmitted through at the second passing by; or the reference light L12 is transmitted through the polarizing beam splitter when it passes by the same, while becomes reflected when it passes by the polarizing beam splitter in its coming back way. The second quarter-wave plate is used to change a polarizing direction of a LGE measuring light L111 and the two-dimensional angle measuring light L112, so that when the LGE measuring light L111 and the two-dimensional angle measuring light L112 pass by the polarizing beam splitter again, the transmitting or reflecting state is switched.

The first polarizer is arranged between the polarizing beam splitter and the first photodetector, and a light transmitting axial direction, i.e., a polarizing axis direction, of the first polarizer can be adjusted to make a combined light L3 interfere after the combined light L3 passes through the first polarizer.

The first photodetector is used to receive a superimposed light L3 including the reference light L12 and the measuring light L111, to realize a simultaneous measurement of LGEs along X, Y and Z axes. Specifically: (1) according to a spot offset of the LGE measuring light L111 on the first photodetector, calculate a relative straightness error between the target mirror unit and the measuring unit along Y axis or Z axis; (2) cooperating with an interference length measuring module to measure a relative position error between the target mirror unit and the measuring unit along X-axis.

The two-dimensional (2D) angle measuring module includes a focusing lens/lens group, and a second photodetector; the focusing lens or lens group is used to focus the two-dimensional angle measuring light L112 on the second photodetector; and a 2D relative angle error between the target mirror unit and the measuring unit rotating about Y-axis or Z-axis is calculated according to the spot offset on the second photodetector.

The beam splitter in the target mirror unit is used to split the measuring light L11, in which a transmitted light L111 is reflected back by the reflector in the target mirror unit to return to the measuring unit with straightness and positioning error information; while a reflected light L112 carries two-dimensional angle information back to the measuring unit.

The reflector in the target mirror unit is used to reflect the measuring light L111 backward, and make the measuring light L111 return to the polarizing beam splitter to realize: (1) changing a spatial position of the measuring light L111 along Y-axis and/or Y-axis, its offset in the spatial position is twice a relative displacement between the reflector in the target mirror unit and the measuring unit along Y-axis and/or Y-axis; (2) changing an optical path and frequency of the measuring light L111, its drift of the optical path and frequency is proportional to a relative displacement of the reflector in the target mirror unit and the measuring unit along X-axis.

Preferably, the laser emitting module emits a single frequency laser, and the interference length measuring module includes a first non-polarizer beam splitter, a phase retarder, and a third photodetector.

The first non-polarizer beam splitter is arranged between a first polarizer and the first photodetector, and is used to split the interference light, in which one beam is received by the first photodetector, while the other beam is received by the third photodetector. Light intensities of interference spots on the first photodetector and the third photodetector are $I_1$, $I_3$, respectively.

The phase retarder is arranged in front of the first photodetector or the third photodetector, to make a phase difference 90° between the interference spot signals $I_1$, $I_3$ detected by the two photodetectors, and a phase difference $\varphi(\Delta x)$ between the reference light L12 and the measuring light L111 is calculated; and a relative displacement $\Delta x$ between the target mirror unit and the measuring unit along X-axis is calculated according to the phase difference.

Preferably, the laser emitting module can generate a dual frequency laser; the interference length measuring module comprises a third non-polarizing beam splitter, a second polarizer, and a fourth photodetector.

The dual frequency laser is a polarized light of two beams which are superposed at a spatial position, made with a certain frequency difference and with different polarizing directions.

The third non-polarizing beam splitter is disposed between the laser emitting module and the polarizing beam splitter, and the emitting light L1 of the laser module is split by the third non-polarizing beam splitter, so as to form another laser beam L2.

The second polarizer is arranged between the third non-polarizer beam splitter and the fourth photodetector, and by adjusting a polarizing axis direction of the second polarizer, the laser light L2 interferes after passing through the second polarizer, and an interference spot is received by the fourth photodetector as a reference signal for a heterodyne interference length measurement.

The combined light L3 interferes after passing through the first polarizer, and an interference spot is received by the first photodetector as a measuring signal of a heterodyne interference length measurement. According to the reference signal and the measurement signal, a relative displacement between the target mirror unit and the measuring unit along X-axis can be calculated.

Preferably, the laser emitting module comprises a multi wavelength laser light source and a heterodyne frequency generating module, the interference length measuring module comprises the 1st to the Nth band-pass filters and the 1st to the Nth phase detectors, where N is a natural number greater than or equal to 3, and the polarizing beam splitter is replaced with a second non-polarizing beam splitter.

The multi wavelength laser light source emits multi wavelength laser lights $\lambda_1$, $\lambda_2$, $\lambda_3$, . . . , $\lambda_N$, their frequencies are $v_1$, $v_2$, $v_3$, . . . , $v_N$. After passing through the heterodyne frequency generating module, their frequencies of the multi wavelength laser become $v_1+f_1$, $v_2+f_2$, $v_3+f_3$, . . . , $v_N+f_N$, the multi wavelength laser light is the emitting light L1. The second non-polarizing beam splitter is used for: (1) beam splitting: splitting the emitting light L1 into a measuring light L11 and a reference light L12, the measuring light L11 is incident on the target mirror unit and is reflected back by the target mirror unit as a light L111 which carries a 3DOF LGE signal to return to the measuring unit as a measuring light, and the reference light L12 only propagates within the measurement unit; (2) beam combining: transmitting or reflecting the reference light L12 that passes by the non-polarizing beam splitter again and the measuring light L111 reflected by the target mirror unit, so that the two beams are superposed together in a spatial position, so as to form a combined beam L3; (3) beam separating: separating the light L112 reflected by the beam splitter in the target mirror unit from the measuring light L11, as a two-dimensional angle measuring light.

The combined light L3 interferes on the first photodetector, making the heterodyne interference signal spectrum only contains components $f_1$, $f_2$, $f_3$, . . . , $f_N$.

After the 1st to the Nth bandpass filters separate the components $f_1$, $f_2$, $f_3$, . . . , $f_N$, a ranging phase information $\varphi_1$, $\varphi_2$, $\varphi_3$, . . . , $\varphi_N$ corresponding to each wavelength is measured by the 1st to the Nth phase detectors. Taking n pairs ($2 \leq n \leq N-1$, n is a natural number) thereof to form a series of beat signals, forming n pairs of combined wavelengths and n pairs of phase difference, and a relative displacement $\Delta x$ between the target mirror unit and the measuring unit along X-axis is calculated.

Preferably, the laser emitting module emits a single frequency laser, and a second non-polarizing beam splitter replaces the polarizing beam splitter. The interference length measuring module includes a first non-polarizing beam splitter, a phase retarder and a third photodetector.

The second non-polarizing beam splitter is used for: (1) beam splitting: splitting the emitting light L1 into a measuring light L11 and a reference light L12, the measuring light L11 is incident on the target mirror unit and is reflected back by the target mirror unit as a light L111 which carries a 3DOF LGE signal to return to the measuring unit as a measuring light, and the reference light L12 only propagates within the measurement unit; (2) beam combining: transmitting or reflecting the reference light L12 that passe by the non-polarizing beam splitter again and the measuring light L111 reflected by the target mirror unit, making the two beams superposed together in a spatial position, so as to form a combined light L3. The combined light L3 is a superimposed beam of the reference light L12 transmitted by the non-polarizing beam splitter and the measuring light L111 reflected by the non-polarizing beam splitter, or a superimposed beam of the reference light L12 reflected by the non-polarizing beam splitter and the measuring light L111 transmitted by the non-polarizing beam splitter; (3) beam separating: separating the light L112 reflected by the beam splitter in the target mirror unit from the measuring light L11, as a two-dimensional angle measuring light.

The first non-polarizer beam splitter is arranged between the first polarizer and the first photodetector, and is used to split the combined beam L3 that has been interfered, one beam L31 is received by the first photodetector, while the other beam L32 is received by the third photodetector. Light intensities of interference spots on the first photodetector and the third photodetector are $I_1$, $I_3$, respectively.

The phase retarder is arranged in front of the first photodetector or the third photodetector, to make a phase difference 90° between interference spot signals $I_1$, $I_3$ detected by the above two photodetectors, then the phase difference $\varphi(\Delta x)$ between the reference light L12 and the measuring light L111 is calculated; and a relative displacement $\Delta x$ between the target mirror unit and the measuring unit along X-axis is calculated according to the phase difference.

Preferably, a rolling angle measuring is added, so as to make simultaneously measuring 6DOF GEs, in which adding a third $\lambda/4$ wave plate (or called a third quarter-wave plate) at the target mirror unit end, so that the measuring light L111 passes by the third quarter-wave plate to return to the measuring unit, passing by the second quarter-wave plate, then is divided when passing by the polarizing beam splitter again, one of which is a light L111' received by the first photodetector, while the other beam is a light L111" received by the fifth photodetector;

when measuring, the third quarter-wave plate is turned about X-axis with a relative angle $\gamma$ between the target mirror unit and the measuring unit, then a polarizing direction rotation angle of the measuring light L111 is $\gamma'$, light intensities received by the first photodetector and the fifth photodetector varies with the angle $\gamma'$, and according to the measured light intensity changes of the first photodetector and the fifth photodetector, a relationship between the light intensity and said angle $\gamma'$, and a proportional relationship between said angle $\gamma'$ and $\gamma$, a relative angle change, i.e., a rolling angle $\gamma$ between the target mirror unit and the measuring unit about X-axis, can be obtained.

Preferably, the fixed reflector is anyone of a pyramid prism, a cat's eye mirror, a corner cube retroreflector composed of three mutually perpendicular reflecting surfaces, a right angle prism, and a mirror group composed of two plane mirrors; and the reflector of the target mirror unit is anyone of a pyramid prism, a cat's eye mirror, and a corner cube retroreflector composed of three mutually perpendicular reflecting surfaces.

Preferably, the first photodetector, the second photodetector, the third photodetector and the fifth photodetector are anyone of QD (four-quadrant photodetector), PSD (Position Sensitive Detector), CCD (Charge-coupled Component), and CMOS (Complementary Metal Oxide Semiconductor); and a relative straightness error between the target mirror unit and the measuring unit along Y-axis or Z-axis is calculated according to a spot offset on anyone of the first photodetector, the third photodetector and the fifth photodetector; and the fourth photodetector is anyone of QD, PSD, CCD, CMOS, and Pin Detector.

According to another aspect of the present invention, there is provided a method for simultaneously measuring 5DOF GEs with a laser, which is applied to the system, the method comprises the following steps:

Step 1: measuring a straightness error along Y-axis or Z-axis based on laser collimation principle or laser autocollimation Step 1.1: when an emitting light L1 emitted by a laser emitting module passes by a polarizing beam splitter, it is divided into a measuring light L11 and a reference light L12.

Step 1.2: the measuring light L11 is emitted from the measuring unit and enters the target mirror unit, and is divided by the beam splitter of the target mirror unit; a transmitted light L111 is reflected back by a reflector of the target mirror unit, a spatial position of the light L111 drifts with a relative straightness error between the target mirror unit and the measuring unit along Y-axis or Z-axis; the light L111 carries a two-dimensional straightness error information back to the measurement unit, then the light L111 passes by the polarizing beam splitter again.

Step 1.3: the reference light L12 is reflected back 180° toward its original direction by the fixed reflector, it passes by the polarizing beam splitter again, and the reference light L12 is combined with the light L111 passing by the polarizing beam splitter again in Step 1.2, so as to form a combined light L3 which is received by the first photodetector.

Step 1.4: an initial position of the combined beam spot is measured by the first photodetector.

Step 1.5: according to a real-time spot of the combined beam on the first photodetector, comparing with the initial spot of the combined beam, a spot offset of the combined light is obtained; since the spot offset of the combined light is only caused by a position drift of the measuring light L111, a relative straightness error between the target mirror unit and the measuring unit along Y-axis or Z-axis is calculated according to the spot offset of the combined light.

Step 2: measuring a position error along X-axis based on a laser interference

Step 2.1: after the reference light L12 in Step 1.1 is reflected back 180° toward its original direction by the fixed reflector of the measuring unit, its polarization state, frequency and phase are not changed, so the light L12 is used as a reference light of the interference length measuring signal.

Step 2.2: the frequency and phase of the light L111 in Step 1.2 change with a relative displacement between the target mirror unit and the measuring unit along X-axis, and the light L111 carries a straightness error information along X-axis and returns to the measuring unit as a measuring light of the heterodyne interference length measuring signal.

Step 2.3: after the reference light L12 in Step 2.1 and the measuring light L111 in Step 2.2 pass through the polarizing beam splitter, the two beams are superposed together in a space; after passing through the interference length measuring module, a relative displacement between the target mirror unit and the measuring unit along X-axis is calculated by referring to the signal measured on the first photodetector.

Step 3: measuring an angle error for rotating around Y-axis or Z-axis based on laser autocollimation Step 3.1: a reflected light of the beam splitter of the target mirror unit in Step 1.2 is a two-dimensional angle measuring light L112.

Step 3.2: the light L112 carries the two-dimensional angle error information back to the measurement unit, and passes by the second quarter-wave plate and the polarizing beam splitter, then are focused on the second photodetector by a focusing lens or lens group.

Step 3.3: an initial position of a light spot is measured by the second photodetector.

Step 3.4: according to a real-time position of the light spot on the second photodetector, comparing with its initial position of the light spot, a spot offset is obtained, and a two-dimensional relative angle error rotating around Y-axis or Z-axis between the target mirror unit and the measuring unit is calculated according to the spot offset.

Preferably, calculating the straightness error along Y-axis or Z-axis according to the spot offset of the combined light comprises:

the initial position and real-time position of the light spot on the first photodetector are $(y1_0, z1_0)$, $(y1_t, z1_t)$, respectively, relative straightness errors between the target mirror unit and the measuring unit along Y-axis or Z-axis are $\Delta y = 2(y1_t - y1_0)$, $\Delta z = 2(z1_t - z1_0)$, respectively.

Preferably, when a single frequency length measurement is applied, the position error along X-axis based on a laser interferometry comprises:

Step 1) the reference light L12 and the measuring light L111 are superposed together in a spatial position after passing through the polarizing beam splitter or the second non-polarizing beam splitter, so as to form a combined light L3; when a polarizing axis direction of a first polarizer is adjusted, the combined light L3 interferes after passing through the first polarizer.

Step 2) the interfered light L3 is divided into a light L31 and a light L32 after passing through the first non-polarizing beam splitter.

Step 3) after one of the light L31 and light L32 is delayed 90° by a phase retarder, they are received by the first photodetector and the third photodetector, respectively, and light intensities of interference spots thereon are $I_1$, $I_3$, respectively.

Step 4) processing the $I_1$, $I_3$, so as to obtain a phase difference $\varphi(\Delta x)$ between the reference light L12 and the measuring light L111, a number $N(\Delta x)$ of light and dark changes of interference fringes caused by $\varphi(\Delta x)$, the laser emitting laser wavelength is $\lambda$, a relative displacement between the target mirror unit and the measuring unit along X-axis $\Delta x=N(\Delta x)\cdot\lambda/2$.

Preferably, when a double frequency length measurement is performed, a position error along X-axis based on a laser interference measurement comprises:

Step 1) the emitting light L1 emitted from the laser emitting module has two polarized beams with a certain frequency difference, frequencies of the two polarized beams are $f_1$, $f_2$, respectively, and when the emitting light L1 is split by the polarization beam splitter, a frequency of the measuring light L11 is $f_1$, while a frequency of the reference light L12 is $f_2$.

Step 2) between the target mirror unit and the measuring unit, a relative displacement of the measuring light L111 along X-axis is $\Delta x$, a frequency variation due to Doppler effect is $f(\Delta x)$, a frequency of the measuring light L111 is $f_1+f(\Delta x)$.

Step 3) setting a first polarizer in front of the first photodetector; by adjusting a polarizing axis direction of the first polarizer, the linearly polarized lights L12 and L111 interfere after passing through the first polarizer; and an interference spot is received by the first photodetector as a measuring signal of a heterodyne interference length measurement, and a frequency of the measured beat signal is measured as $f_m=f_1+f(\Delta x)-f_2$.

Step 4) when the emitting light L1 passes by the third non-polarizing beam splitter, it is split by the third non-polarizing beam splitter to form another laser beam L2; and a polarizing axis direction of the second polarizer is adjusted, so that a light L2 interferes after passing through the second polarizer; an interference spot is received by the fourth photodetector as a standard signal for the heterodyne interference length measurement, and a frequency of a standard signal is $f_s=f_1-f_2$.

Step 5) the frequency of the measured beat signal obtained in Step 3), $f_m=f_1+f(\Delta x)-f_2$, subtracts the standard beat signal frequency obtained in step 4), $f_s=f_1-f_2$, to obtain $f(\Delta x)=f_m-f_s$, a number of light and dark changes of interference fringes caused by $f(\Delta x)$ is $N(\Delta x)$, a laser emitting laser wavelength is $\lambda$, so a relative displacement between the target mirror unit and the measuring unit along X-axis is $\lambda x=N(\Delta x)\cdot\lambda/2$.

Preferably, when a multiple wavelength length measurement is applied, determining a position error along X-axis based on a laser interference comprises:

Step 1) a multi wavelength laser light source emits multi wavelength laser lights $\lambda_1$, $\lambda_2$, $\lambda_3$, . . . , $\lambda_N$, their frequencies are $v_1$, $v_2$, $v_3$, . . . , $v_N$; after passing through the heterodyne frequency generating module, their frequencies of the multi wavelength laser become $v_1+f_1$, $v_2+f_2$, $v_3+f_3$, . . . , $v_N+f_N$, in which the multi wavelength laser light is an emitting light L1.

Step 2) the emitting light L1 is split into a measuring light L11 and a reference light L12 by the second non-polarizing beam splitter, and the measuring light L11 and the reference light L12 both contain multi wavelength laser beams $v_1+f_1$, $v_2+f_2$, $v_3+f_3$, . . . , $v_N+f_N$.

Step 3) the measuring light L11 is emitted from the measuring unit to enter the target mirror unit, and is reflected back 180° toward its original direction by the reflector of the target mirror unit; a retroreflected light L111 carries a straightness error information along X-axis to return to the measuring unit as a measuring light of the heterodyne interference length measuring signal.

Step 4) after the reference light L12 is reflected back 180° toward its original direction by the fixed reflector of the measuring unit, it passes by the non-polarizing beam splitter, and then combines with the light L111, by adjusting a polarizing axis direction of the first polarizer, the reference light L12 and the measuring light L111 interfere with each other on the first photodetector.

Step 5) the first photodetector detects components of the heterodyne interference signal spectrum, such as $f_1$, $f_2$, $f_3$, . . . , $f_N$, the 1st to the Nth band-pass filters separate the components $f_1$, $f_2$, $f_3$, . . . , $f_N$, and the 1st to the Nth phase detectors measure those ranging phase information $\varphi_1$, $\varphi_2$, $\varphi_3$, . . . , $\varphi_N$ corresponding to each wavelength. Taking n pairs of beat signals, and a relative displacement $\Delta x$ between the target mirror unit and the measuring unit along X-axis is calculated according to n pairs of combined wavelengths and n pairs of phase difference.

Preferably, calculation of a two-dimensional angular error for rotating around Y-axis or Z-axis according to the spot offset comprises:

an initial position and a real-time position of a light L112's spot on the second photodetector are $(y_0, z_0)$, $(y_t, z_t)$, respectively, then relative angle errors between the target mirror unit and the measuring unit for rotating around Y-axis or Z-axis are $\Delta\alpha=(y_t-y_0)/2f$, $\Delta\beta=(z_t-z_0)/2f$, respectively, where f is a focal length of a focusing lens or lens group.

Preferably, by adding a third quarter-wave plate in the target mirror unit for measuring a rolling angle in a single frequency length measurement, an angular error resulted from rotating around X-axis can be measured, i.e., a method for measuring 6DOF GEs includes:

Step 1) adding a third quarter-wave plate in the target mirror unit, the measuring light L111 passes by the third quarter-wave plate to return to the measuring unit; after passing through the second quarter-wave plate, the measuring light L111 is split when passing by the polarizing beam splitter again, in which one light L111' is received by the first photodetector and the third photodetector, while the other light L111'' is received by the fifth photodetector.

Step 2) by blocking the measuring light L111, the reference light L12 is received on the first photodetector and the third photodetector only, light intensities of the first photodetector and the third photodetector $I_{10}$, $I_{30}$.

Step 3) recovering the measuring light L111; by the third quarter-wave plate, making a relative angle variation $\gamma$ between the target mirror unit and the measuring unit around X-axis; when the measuring light passes by the polarizing beam splitter again, its polarizing direction increases $\gamma'$ with its original polarizing direction; $\gamma'$ and y is in a direct proportion, $\gamma'=k_1\gamma$; when the measuring light passes by the second quarter-wave plate in the target mirror unit for the first time, $k_1=1$; when the measuring light passes by the second quarter-wave plate in the target mirror unit for the second time, $k_1=2$.

Step 4) the measuring light L111 passes by the polarizing beam splitter and is split by the polarizing beam splitter; one beam of the light is received by the first photodetector and the third photodetector, light intensities thereon are $I_1(\gamma)$, $I_3(\gamma)$; the other beam is received by the fifth photodetector, its light intensity is $I_5(\gamma)$; there exists such a function: $f(\gamma)=[I_1(\gamma)-I_{10}+I_3(\gamma)-I_{30}-I_5(\gamma)]/[I_1(\gamma)-I_{10}+I_3(\gamma)-I_{30}+I_5(\gamma)]$.

Step 5) rotating the target mirror unit around X-axis by several specific angles $\gamma_1$, $\gamma_2$, . . . , measuring the corresponding $f(\gamma_1)$, $f(\gamma_2)$, . . . , and calibrating a function curve of $f(\gamma)$ v. $\gamma$.

Step 6) measuring the light intensities $I_1(\gamma)$, $I_3(\gamma)$, $I_5(\gamma)$ in real time, calculating $f(\gamma)$ according to Step 4); calculating a relative rotation angle $\gamma$ between the target mirror unit and the measuring unit about X-axis based on the function $f(\gamma)$ v. $\gamma$ according to Step 5).

Preferably, for measuring a rolling angle in a dual frequency length measurement, a third quarter-wave plate is added in the target mirror unit, so as to measure an angular error resulted from rotating around X-axis, i.e., a 6DOF GEs can be measured, the method comprises the following steps:

Step 1) adding a third quarter-wave plate in the target mirror unit, the measuring light L111 passes by the third quarter-wave plate to return to the measuring unit, when passing by the second quarter-wave plate again, the measuring light L111 is split when passing by the polarizing beam splitter, one beam L111' is received by the first photodetector, while the other L111" is received by the fifth photodetector.

Step 2) blocking the measuring light L111, so that only the reference light L12 is received on the first photodetector, a light intensity of the first photodetector is ho.

Step 3) recovering the measuring light L111, by turning the third quarter-wave plate, making a relative angle $\gamma$ between the target mirror unit and the measuring unit around X-axis; when the measuring light passes by the polarizing beam splitter again, its polarizing direction increases by $\gamma'$ with respect to its original polarizing direction, $\gamma'$ is in a direct proportion of $\gamma$, $\gamma'=k_1\gamma$; when the measuring light passes by the second quarter-wave plate in the target mirror unit for the first time, $k_1=1$; when the measuring light passes by the second quarter-wave plate in the target mirror unit for the second time, $k_1=2$.

Step 4) the measuring light L111 passes by the polarizing beam splitter and is split by the polarizing beam splitter; one beam is received by the first photodetector, its light intensity is $I_1(\gamma)$, while the other beam is received by the fifth photodetector, its light intensity is $I_5(\gamma)$; $f(\gamma)=[I_1(\gamma)-I_{10}-I_5(\gamma)]/[I_1(\gamma)-I_{10}+I_5(\gamma)]$.

Step 5) rotating the target mirror unit around X-axis by several specific angles $\gamma_1$, $\gamma_2$, . . . , measuring the corresponding $f(\gamma_1)$, $f(\gamma_2)$, and calibrating a functional curve of $f(\gamma)$ v. $\gamma$.

Step 6) measuring light intensities $I_1(\gamma)$, $I_5(\gamma)$ in real time, calculating $f(\gamma)$ according to Step (4), calculating a rotation angle $\gamma$ of the target mirror unit about X-axis according to the function $f(\gamma)$ v. $\gamma$ calibrated in Step (5).

It can be seen from the technical solutions provided by the above embodiments of the present invention that the embodiments of the present invention can realize: 1) a simultaneous and rapid measurement of 5/6DOF GEs of a space object moving linearly along a linear axis; 2) longtime monitoring a relative deformation of 5/6DOF position and attitude of two objects in a space.

Further aspects and advantages of the present invention will be introduced in the following description, so as to become apparent from the following description, or will be corroborated in practice of the present invention.

BRIEF DESCRIPTION OF ACCOMPANYING DRAWING

In order to more clearly explain technical solutions of the present invention, the following will briefly introduce embodiments with accompanying drawings. It is obvious that the drawings in the following description are only relevant to some embodiments of the present invention. For those skilled in the art, other drawings can be obtained according to these drawings without creative work.

Figure 1:
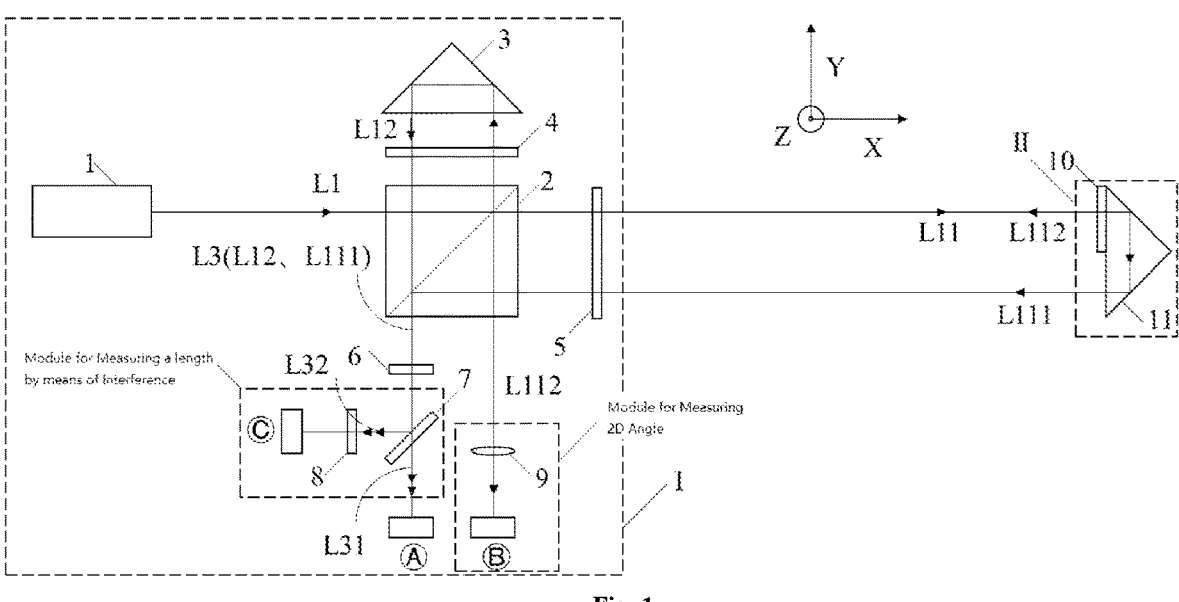
FIG. 1 is a schematic view of a system for simultaneously measuring 5DOF (degrees-of-freedom) GEs (geometric-errors) by a single frequency laser with a transmitting sensitive structure according to an embodiment of the present invention.

The drawings show a measuring unit I, a target mirror unit II, a single frequency laser 1, a polarizing beam splitter 2, a fixed pyramid prism 3, a first quarter-wave plate 4, a second quarter-wave plate 5, a first polarizer 6, a first non-polarizing beam splitter 7, a half-wave plate 8, a focusing lens 9, a half transmitting and half reflecting mirror 10, a moving pyramid prism 11, a second non-polarizing beam splitter 12, a third quarter-wave plate 13, a dual frequency laser 14, a third non-polarizing beam splitter 15, a multi wavelength laser light source 16, a heterodyne frequency generating module 17, a first bandpass filter 18, a second bandpass filter 19, a third bandpass filter 20, a first phase detector 21, a second phase detector 22, a third phase detector 23, a first photodetector (A), a second photodetector (B), a third photodetector (C), a fourth photodetector (D), and a fifth photodetector (E).

BEST MODES FOR CARRYING OUT THE INVENTION

Embodiments of the present invention will be described in detail together with the accompanying drawings, in which the same or similar reference numerals throughout indicate the same or similar elements having the same or similar functions. Those embodiments referring to the accompanying drawings are exemplary, are only used to explain the present invention, and cannot be interpreted as limiting the present invention.

It can be understood by those skilled in the art that a singular form "a", "one", "said" and "the" used herein may also include plural components, unless it is specifically stated. It should be further understood that a phrase "including" or "comprising" used in the present description refers to features, integers, steps, operations, elements and/or components shown in the application, but does not exclude presence or addition of one or more other features, integers, steps, operations, elements, components and/or combinations thereof. It should be understood that when an element is "connected" or "coupled" to another element, it may be directly connected or coupled to other elements without or with intermediate elements. In addition, the term "connection" or "coupling" used herein may include wireless connection or coupling. The term "and/or" as used herein includes any unit and all combinations of one or more associated listed items.

Those skilled in the art can understand that, unless otherwise defined, all terms (including technical terms and scientific terms) used herein have the same meaning as those generally understood by those skilled in the art. It should also be understood that terms such as those defined in the general dictionary should be understood to have a meaning consistent with that in prior art, and cannot be simply interpreted as its literal meaning.

In order to facilitate to understand the present invention, several specific embodiments will be explained together with the accompanying drawings, and each embodiment does not constitute a limitation of the present invention.

In a XYZ spatial coordinate system of the present invention, "6DOF GEs" includes three straightness errors in translating along X, Y and Z directions, and three angle errors in rotating around X, Y and Z coordinate axes. In the subsequent embodiments, a direction in which a laser light enters a target mirror unit is set as a direction of X-axis.

Embodiment 1

According to one aspect of the present invention, as shown in FIG. 1, there is provided a system for simultaneously measuring 5DOF (degree of freedom) GEs (geometric errors) by a laser. The system is composed of a measuring unit I and a target mirror unit II.

The measuring unit I includes a single frequency laser 1, a polarizing beam splitter 2, a fixed pyramid prism 3, a first quarter-wave plate 4, a second quarter-wave plate 5, a first polarizer 6, a first non-polarizing beam splitter 7, a half-wave plate 8, a focusing lens 9, a first photodetector (A), a second photodetector (B), and a third photodetector (C). The single frequency laser 1 constitutes a laser emitting module. The first non-polarizing beam splitter 7, the half-wave plate 8, and the third photodetector (C) constitute an interference length measuring module. The focusing lens 9 and the second photodetector (B) constitute a two-dimensional angle measuring module.

The target mirror unit II includes a half transmitting and half reflecting mirror 10 and a moving pyramid prism 11.

In the measuring unit I, the single frequency laser 1 is used to generate an emitting light L1, and the emitting light L1 is a circularly polarized light;

1) beam splitting: the emitting light or emergent light L1 is divided into a measuring light L11 and a reference light L12, the measuring light L11 is incident on the target mirror unit, transmitted by a half transmitting and half reflecting mirror 10 of the target mirror unit, and reflected back by the moving pyramid prism 11, so as to form a light L111, the light L111 carries a 3DOF LGEs (linear geometric errors) signal back to the measuring unit I as a LGE measuring light; the reference light L12 only propagates within the measuring unit I; 2) beam combining: the reference light L12 that passes by the polarizing beam splitter 2 again transmits the polarizing beam splitter 2, and the measuring light L111 reflected back by the target mirror unit II is reflected by the polarizing beam splitter 2, so that the two beams are superposed together in a spatial position, so as to form a combined light L3; 3) beam separating: the light L112 reflected by the half transmitting and half reflecting mirror 10 of the target mirror unit II is reflected as a two-dimensional angle measuring light.

The fixed pyramid prism 3 is used to reflect backward the reference light L12 propagating only inside the measuring unit I, and return the reference light L12 to the polarizing beam splitter 2.

The first quarter-wave plate 4 is used to change a polarizing direction of the reference light L12, so that the reference light L12 is reflected by the polarizing beam splitter 2, transmitted through the first quarter-wave plate 4, reflected backward by the fixed pyramid prism 3, transmitted back through the first quarter-wave plate 4 again, then transmitted through the polarizing beam splitter 2, that is, with the first quarter-wave plate 4, when the reference light L12 hits on the polarizing beam splitter 2 for the first time, the reference light L12 is reflected by the polarizing beam splitter 2, while when the reference light L12 returns to the polarizing beam splitter 2, the reference light L12 becomes transmitted through the polarizing beam splitter 2.

The second quarter-wave plate 5 is used to change polarizing directions of the LGE measuring light L111 and the two-dimensional angle measuring light L112, so that the measuring light L111 and the two-dimensional angle measuring light L112 are reflected by the polarization beam splitter 2 when they return to the polarization beam splitter again.

The first polarizer 6 is arranged between the polarizing beam splitter 2 and the first photodetector (A), and as a polarizing axis direction of the first polarizer is adjusted, the combined beam L3 interferes after passing through the first polarizer 6.

The first non-polarizing beam splitter 7 is arranged between the first polarizer 6 and the first photodetector (A) for splitting the interference light L3, in which one beam is received by the first photodetector (A), while the other beam is received by the third photodetector (C). Light intensities of interference spots on the first photodetector (A) and the third photodetector (C) are $I_1$, $I_3$, respectively.

The half-wave plate 8 is arranged between the first non-polarizing beam splitter 7 and the third photodetector (C), to make a phase difference 90° between the interference spot signals $I_1$, $I_3$ detected by the two detectors, calculate a phase difference $\varphi(\Delta x)$ between the reference light L12 and the measuring light L111, and calculate a displacement $\Delta x$ of the target mirror unit along X-axis according to the phase difference.

The focusing lens 9 is used to focus the two-dimensional angle measuring light L112 on the second photodetector (B).

The first photodetector (A) is used to receive the superimposed light beam L3 including the reference light L12 and the measuring light L111, so as to 1) calculate straightness errors of the target mirror unit II along Y-axis and Z-axis according to a spot offset of L111 on the first photodetector (A); and 2) coordinate with the interference length measuring module to measure a position error of the target mirror unit II along X-axis.

The second photodetector (B) is configured to receive the two-dimensional angle measuring light L112 containing the two-dimensional angle error information, and calculate two-dimensional angle errors of the target mirror unit rotating about Y-axis and Z-axis according to a spot offset of the two-dimensional angle measuring light L112 on the second photodetector (B).

The third photodetector (C) is used to receive the superimposed light beam L3 including the reference light L12 and the measuring light L111, and cooperate with the first photodetector (A) to measure a position error of the target mirror unit II along X-axis.

In the target mirror unit II, the half transmitting and half reflecting mirror 10 is used to split the measuring light L11 directed to the target mirror unit II: a transmitted light L111, reflected back by the moving pyramid prism 11 to return to the measuring unit I with two-dimensional straightness and positioning error information; and a reflected light L112, an angle offset between the reflected light L112 and the incident measuring light L11 around Y-axis or Z-axis is twice an angle offset of the half transmitting and half reflecting mirror 10 itself around Y-axis or Y-axis; the light L112 carries the two-dimensional angle information back to the measuring unit I.

The moving pyramid prism 11 is used to reflect the measuring light L111 backward and return the measuring light L111 to the polarizing beam splitter 2 so as to realize: (1) changing a spatial position of the measuring light L111 along Y-axis or Y-axis, and an offset value in a spatial position is twice a displacement of the moving pyramid prism 11 itself along Y-axis or Y-axis; and (2) changing an optical path and frequency of the measuring light L111, and a drift of the optical path and frequency is proportional to a displacement of the moving pyramid prism 11 along X-axis.

As shown in FIG. 1, a method for simultaneously measuring 5DOF GEs by a laser according to an embodiment of the present invention includes the following steps:

Step 1: measure a straightness error along Y-axis or Z-axis based on laser autocollimation principle.

Step 1.1: an emitting light L1 of a single frequency laser 1 passes by a polarizing beam splitter 2, to be divided into a measuring light L11 and a reference light L12, the measuring light L11 transmits through the polarizing beam splitter 2, the reference light L12 is reflected by the polarizing beam splitter 2; the measuring light L11 and the reference light L12 are both a linearly polarized light; and polarizing directions thereof are perpendicular to each other.

Step 1.2: the measuring light L11 passes by a second quarter-wave plate 5, the linearly polarized light is changed into a circularly polarized light, which is emitted from the measuring unit I to hit the target mirror unit II, and is split by a half transmitting and half reflecting mirror 10 of the target mirror unit the transmitted light L111 is reflected back by a moving pyramid prism 11 of the target mirror unit II, a spatial position of the light L111 drifts with a straightness error of the target mirror unit II along Y-axis or Z-axis and carries the two-dimensional straightness error information back to the measuring unit I, and passes by the second quarter-wave plate 5 again, to shift the circularly polarized light to a linearly polarized light, but a polarizing direction passing through the second quarter-wave plate 5 is rotated by 90°, so that the light L111 becomes reflected by the polarizing beam splitter 2 when it passes by the polarizing beam splitter 2 again.

Step 1.3: the reference light L12 passes by the first quarter-wave plate 4, the linearly polarized light is changed into a circularly polarized light; after the light L12 is reflected back 180° toward its original direction by a fixed pyramid prism 3 to pass through the first quarter-wave plate 4 in a return way, the circularly polarized light is shifted back into a linearly polarized light, but a polarizing direction is rotated by 90°, so that the light L12 transmits through the polarizing beam splitter 2 when it passes by the polarizing beam splitter 2 again, and is combined with the light L111 reflected by the polarizing beam splitter in Step 1.2, so as to form a combined light L3, then the combined light L3 passes by a first polarizer 6 and a first non-polarizing beam splitter 7, and is finally received by the first photodetector (A).

Step 1.4: recording an initial position $(y1_0, z1_0)$ of the combined beam L3's spot measured by the first photodetector (A), preferably, the initial position is located at a center of the first photodetector (A).

Step 1.5: according to a real-time position $(y1_t, z1_t)$ of the combined beam L3's spot on the first photodetector (A) and the initial position $(y1_0, z1_0)$ of the combined beam L3's spot, an offset of the combined beam's spot position is obtained; since the offset of the combined beam's spot is only caused by a drift of the measuring light L111, a straightness error of the target mirror unit along Y-axis or Z-axis can be calculated by $\Delta y=2(y1_t-y1_0)$, $\Delta z=2(z1_t-z1_0)$.

Step 2: a position error along X-axis is measured based on a single frequency laser interference.

Steps 2.1: after the reference light L12 in Step 1.1 is reflected back 180° toward its original direction by the fixed pyramid prism 3 of the measuring unit I, its polarization state, frequency and phase are not changed, so the light L12 can be used as a reference light of the interference length measuring signal;

Step 2.2: the frequency and phase of the light L111 in Steps 1.2 change with a displacement of the target mirror unit II along X-axis, so that the light L111 carries a straightness error information along X-axis and returns to the measuring unit as a measuring light of the heterodyne interference length measuring signal;

Step 2.3: by adjusting a polarizing axis direction of the first polarizer, the combined light L3 obtained in Step 1.3 interferes after passing through the first polarizer 6;

Step 2.4: after the interference light L3 passes by the first non-polarizing beam splitter 7, it is divided into a transmitted light L31 and a reflected light L32;

Step 2.5: the transmitted light L31 is received by the first photodetector (A), a light intensity of the interference spot is $I_1$, and a phase of the reflected light L32 is delayed 90° by a half-wave plate 8, then is received by a third photodetector (C), and a light L32's intensity of the interference spot is $I_3$;

Step 2.6: a phase difference between the reference light L12 and the measuring light L111 is $\varphi(\Delta x)$, based on the $I_1$ and $I_3$, a number of light and dark changes of interference fringes caused by $\varphi(\Delta x)$ is $N(\Delta x)$, a laser emitting laser wavelength is $\lambda$, then a displacement of the target mirror unit II along X-axis is $\Delta x=N(\Delta x)\cdot\lambda/2$.

Step 3: measuring an angle error for rotating about Y-axis or Z-axis based on laser autocollimation.

Step 3.1: a reflected light of a half transmitting and half reflecting mirror 10 of the target mirror unit II in Step 1.2 is a two-dimensional angle error measuring light L112, Step 3.2: the light L112 carries the two-dimensional angle error information back to the measuring unit I, and passes by the second quarter-wave plate 5, then the light L112 is reflected by the polarizing beam splitter 2, and then is focused on the second photodetector (B) by a focusing lens 9 of a two-dimensional angle measuring module;

Step 3.3: recording an initial position $(y_0, z0)$ of a light spot measured by the second photodetector (B);

Step 3.4: according to a real-time position $(y_t, z_t)$ of the spot on the second photodetector (B) and the initial position of the spot, an offset of the spot is obtained; according to the offset of the spot, a two-dimensional angle error of the target mirror unit rotating around Y-axis or Z-axis is calculated as follows: $\Delta\alpha=(y_t-y_0)/2f$, $\Delta\beta=(z_t-z_0)/2f$, where f is a focal length of a focusing lens or a lens group.

In Embodiment 1, if the half-wave plate 8 is moved to between the first non-polarizing beam splitter 7 and the first photodetector (A), a position error along X-axis can also be measured based on the laser interference.

If the light L1 emitted from the single frequency laser is a linearly polarized light, an additional half-wave plate is required; by rotating the half-wave plate, a polarizing direction of the emitting light L1 is incident at a certain angle (preferably) 45° with respect to an optical axis of the polarizing beam splitter 2.

Embodiment 2

Figure 2:
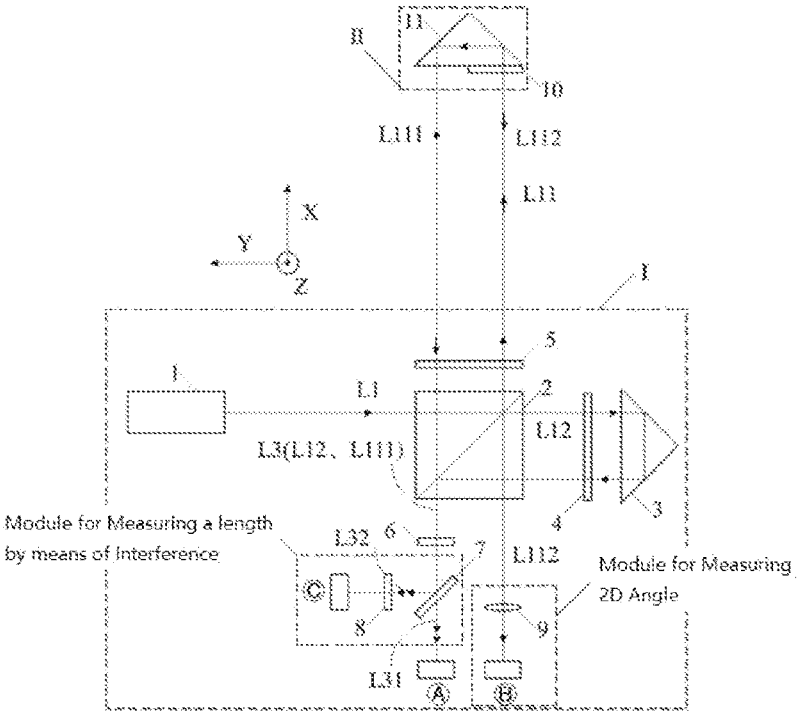
FIG. 2 is a schematic view of a system for simultaneously measuring 5DOF GEs by a single frequency laser with a reflecting sensitive structure according to an embodiment of the present invention.

FIG. 2 is a schematic view of a system for simultaneously measuring 5DOF GEs by a laser according to Embodiment 2 of the present invention. As shown in FIG. 2, according to one aspect of the present invention, there is provided a system for simultaneously measuring 5DOF GEs by a laser, which is composed of a measuring unit I and a target mirror unit II.

The measuring unit I in Embodiment 2 has the same components as the measuring unit I in Embodiment 1, and the target mirror unit II in Embodiment 2 has the same components as the target mirror unit II in Embodiment 1. The difference is that when an emitting light L1 passes by a polarizing beam splitter 2, its reflected light is taken as a measuring light L11, and the target mirror unit II is arranged in a direction for reflecting the light L1 by the polarizing beam splitter 2, while a transmitted light of the polarizing beam splitter 2 is taken as a reference light L12, a fixed pyramid prism 3 and a first quarter-wave plate 4 are disposed in a direction in which the polarizing beam splitter 2 transmits through the light L1. For convenience, a structure in which a transmitted light of a light L1 in Embodiment 1 is used as a measuring light L11 is called a transmitting sensitive structure, while a structure in which a reflected light of a light L1 in Embodiment 2 is used as a measuring light L11 is referred to as a reflecting sensitive structure.

In the measuring unit I, the polarizing beam splitter 2 is used for: (1) beam splitting: the emitting light L1 is divided into a measuring light L11 and a reference light L12, the measuring light L11 is incident on the target mirror unit, transmitted by the half transmitting and half reflecting mirror 10 of the target mirror unit, and reflected back by the moving pyramid prism 11 as a light L111, the light L111 carries 3DOF LGE signals back to the measuring unit I as a linear GE measuring light; the reference light L12 only propagates within the measuring unit I; (2) beam combining: the reference light L12 that passes by the polarizing beam splitter 2 again is reflected, and a measuring light L111 that is reflected back by the target mirror unit II transmits through the polarizing beam splitter 2, so that the two beams are superposed together in a spatial position, so as to form a combined light L3; (3) beam separating: the light L112 reflected by the half transmitting and half reflecting mirror 10 of the target mirror unit II transmits through the polarizing beam splitter 2 as a two-dimensional angle measuring light.

The first quarter-wave plate 4 is used to change a polarizing direction of the reference light L12. so that the reference light L12 is reflected by the polarizing beam splitter 2 to pass by the first quarter-wave plate 4, then is reflected backward by the fixed pyramid prism 3 to pass by the first quarter-wave plate 4 pass again by the polarizing beam splitter 2, then it becomes reflected by the polarizing beam splitter 2.

The second quarter-wave plate 5 is used to change polarizing directions of the LGE measuring light L111 and the two-dimensional angle measuring light L112, so that the measuring light L111 and the two-dimensional angle measuring light L112 become transmit through the polarization beam splitter 2 when they pass by the polarization beam splitter again.

The functions of other components are the same as those in Embodiment 1 and will not be described again.

The functions of the half transmitting and half reflecting mirror 10 and the moving pyramid prism 11 in the target mirror unit II are the same as those in Embodiment 1 and will not be described again.

As shown in FIG. 2, the present Embodiment 2 provides a method for simultaneously measuring 5DOF GEs by a laser, which includes the following steps:

Step 1: measuring a straightness error along Y-axis or Z-axis based on laser autocollimation principle.

Step 1.1: when the emitting light L1 of the single frequency laser 1 passes by the polarizing beam splitter 2, it is divided into a measuring light L11 and a reference light L12, the measuring light L11 is reflected by the polarizing beam splitter 2, the reference light L12 transmits through the polarizing beam splitter 2; the measuring light L11 and the reference light L12 are both a linearly polarized light, and their polarizing directions are perpendicular to each other.

Step 1.2: the measuring light L11 passes by the second quarter-wave plate 5, the linearly polarized light is changed into a circularly polarized light; the measuring light L11 is emitted from the measuring unit I to hit the target mirror unit II, and is split by the half transmitting and half reflecting mirror 10 of the target mirror unit the transmitted light L111 is reflected back by the moving pyramid prism 11 of the target mirror unit II, a spatial position of the light L111 drifts with a straightness error of the target mirror unit II along Y-axis or Z-axis; the light L111 carries the two-dimensional straightness error information back to the measuring unit I and passes by the second quarter-wave plate 5 again, then the light L111 changes from the circularly polarized light to a linearly polarized light, but a polarizing direction after passing by the second quarter-wave plate 5 is further rotated by 90°, so that the light L111 becomes transmitting through the polarizing beam splitter 2 when it passes by the polarizing beam splitter 2 again.

Step 1.3: the reference light L12 passes by the first quarter-wave plate 4, the linearly polarized light is changed into a circularly polarized light; the reference light L12 is reflected back 180° toward its original direction by the fixed pyramid prism 3 and passes by the first quarter-wave plate 4 again, the circularly polarized light is changed into a linearly polarized light, but the polarizing direction is further rotated by 90°, so that the light L12 becomes reflected by the polarizing beam splitter when it passes by the polarizing beam splitter again, and is combined with the light L111 transmitted by the polarizing beam splitter in Step 1.2, so as to form a combined light L3, then the light L3 passes by the first polarizer 6 and the first non-polarizing beam splitter 7, and is finally received by the first photodetector (A).

Steps 1.4 and 1.5: they are the same as those in Embodiment 1 and will not be described again.

Step 2: a position error along X-axis is measured based on a single frequency laser interference, which is consistent with Embodiment 1 and will not be described again.

Step 3: measuring an angle error for rotating around Y-axis or Z-axis based on laser autocollimation, which is consistent with Embodiment 1 and will not be described again.

In Embodiment 2, if the half-wave plate 8 is moved between the first non-polarizing beam splitter 7 and the first photodetector (A), a position error along X-axis can also be measured based on a laser interference.

If the light L1 emitted from the single frequency laser is a linearly polarized light, an additional half-wave plate is required; by rotating the half-wave plate, a polarizing direction of the emitting light L1 is incident at a certain angle (preferably) 45° with respect to an optical axis of the polarizing beam splitter 2.

Embodiment 3

Figure 3:
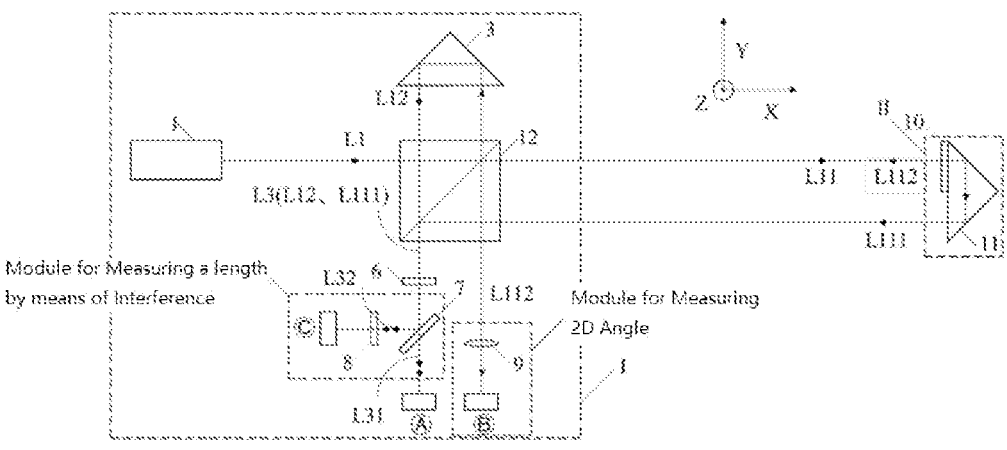
FIG. 3 is a schematic view of a system for simultaneously measuring 5DOF GEs by a single frequency laser with a transmitting sensitive structure according to an embodiment of the present invention.

FIG. 3 is a schematic view of a system for simultaneously measuring 5DOF GEs by a laser according to Embodiment 3 of the present invention. As shown in FIG. 3, according to one aspect of the present invention, a system for simultaneously measuring 5DOF GEs by the laser is provided, which is composed of a measuring unit I and a target mirror unit II.

The measuring unit I includes a single frequency laser 1, a second non-polarizing beam splitter 12, a fixed pyramid prism 3, a first polarizer 6, a first non-polarizing beam splitter 7, a half-wave plate 8, a focusing lens 9, a first photodetector (A), a second photodetector (B), and a third photodetector (C). The single frequency laser 1 constitutes a laser emitting module. The first non-polarizing beam splitter 7, the half-wave plate 8, and the third photodetector (C) constitute an interference length measuring module. The focusing lens 9 and the second photodetector (B) constitute a two-dimensional angle measuring module.

The target mirror unit II is the same as that of Embodiment 1.

In the measuring unit I, the single frequency laser 1 is used to generate an emitting light L1, which is a circularly polarized light or a linearly polarized light;

the second non-polarizing beam splitter 12 is used for: (1) beam splitting: the emitting light L1 is divided into a measuring light L11 and a reference light L12, the measuring light L11 is emitted to the target mirror unit by transmitting through the half transmitting and half reflecting mirror 10 of the target mirror unit, and reflected back by the moving pyramid prism 11, so as to form a light L111, the light L111 carries a 3DOF LGE signal back to the measuring unit I as a LGE measuring light; the reference light L12 only propagates within the measuring unit I; (2) beam combining: a part of the reference light L12 that is transmitted by the second non-polarizing beam splitter 12 when passing by the same again and a part of the measuring light L111 that is reflected backward by the target mirror unit II are superposed together in a spatial position, so as to form a combined light L3; (3) beam separating: the light L112 reflected by the half transmitting and half reflecting mirror 10 of the target mirror unit II is as a two-dimensional angle measuring light.

The fixed pyramid prism 3, the first polarizer 6, the half-wave plate 8, the focusing lens 9, the first photodetector (A), the second photodetector (B), and the third photodetector (C) have the same functions as those of Embodiment 1, and will not be described again.

The present embodiment 3 provides a method for simultaneously measuring 5DOF GEs by a laser, which comprises the following steps:

Step 1: measuring a straightness error along Y-axis or Z-axis based on laser autocollimation principle Step 1.1: an emitting light L1 of a single frequency laser 1, passing by a second non-polarizing beam splitter 12, is divided into a measuring light L11 and a reference light L12; the measuring light L11 transmits through the second non-polarizing beam splitter 12 and the reference light L12 is reflected by the second non-polarizing beam splitter 12.

Step 1.2: the measuring light L11 is emitted from the measuring unit I to hit the target mirror unit II, and is split by a half transmitting and half reflecting mirror 10 of the target mirror unit a transmitted light L111 is reflected back 180° toward its original direction by the moving pyramid prism 11 of the target mirror unit a spatial position of L111 drifts with a straightness error of the target mirror unit II along Y-axis or Z-axis; the light L111 carries a two-dimensional straightness error information back to the measuring unit I and passes by the second non-polarizing beam splitter 12, then the light L111 is divided into a reflection part and a transmission part by the second non-polarizing beam splitter 12.

Step 1.3: the reference light L12 is reflected back 180° toward its original direction by the fixed pyramid prism 3 to transmit through the second non-polarizing beam splitter 12 when passing by the same again, then the reference light L12 is combined with the reference light L111 reflected by the second non-polarizing beam splitter 12 in Step 1.2, so as to form a combined light L3; then the combined light L3 passes by the first polarizer 6 and the first non-polarizing beam splitter 7, and finally is received by the first photodetector (A).

Steps 1.4 and 1.5: they are the same as those in Embodiment 1 and will not be described again.

Step 2: a position error along X-axis is measured based on a single frequency laser interference, which is consistent with Embodiment 1 and will not be described again.

Step 3: measuring an angle error for rotating around Y-axis or Z-axis based on laser autocollimation Step 3.1: it is consistent with Embodiment 1 and will not be described again.

Step 3.2: the light L112 returns a two-dimensional angle error information to the measuring unit I; when passing by the second non-polarizing beam splitter 12, the reflected light is focused on the second photodetector (B) by the focusing lens 9 of a two-dimensional angle measuring module.

Steps 3.3 and 3.4: they are the same as those in Embodiment 1 and will not be described again.

Embodiment 3 has the other 3 variants.

Figure 4:
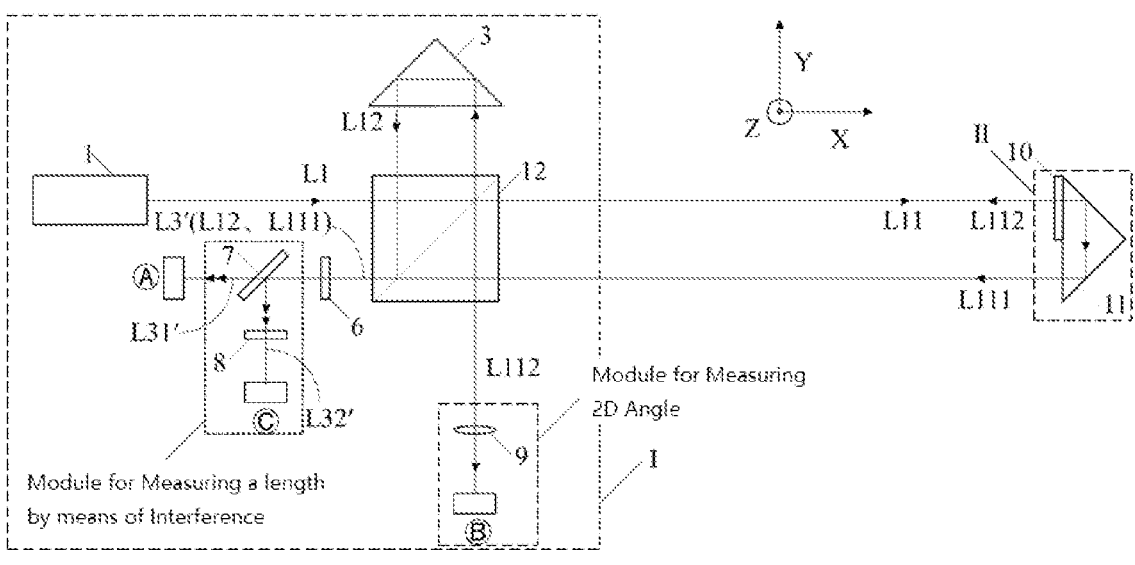
FIG. 4 is a schematic view of a system for simultaneously measuring 5DOF GEs by a single frequency laser with a transmitting sensitive structure according to an embodiment of the present invention.

As shown in FIG. 4, the reflected light L12 when passing by the second non-polarizing beam splitter 12 for the second time and the transmitted light L111 passing by the second non-polarizing beam splitter 12 are combined to form a combined light L3', and the first polarizer 6, the interference length measuring module and the first photodetector (A) are arranged in an emitting direction of the combined light L3'.

Figure 5:
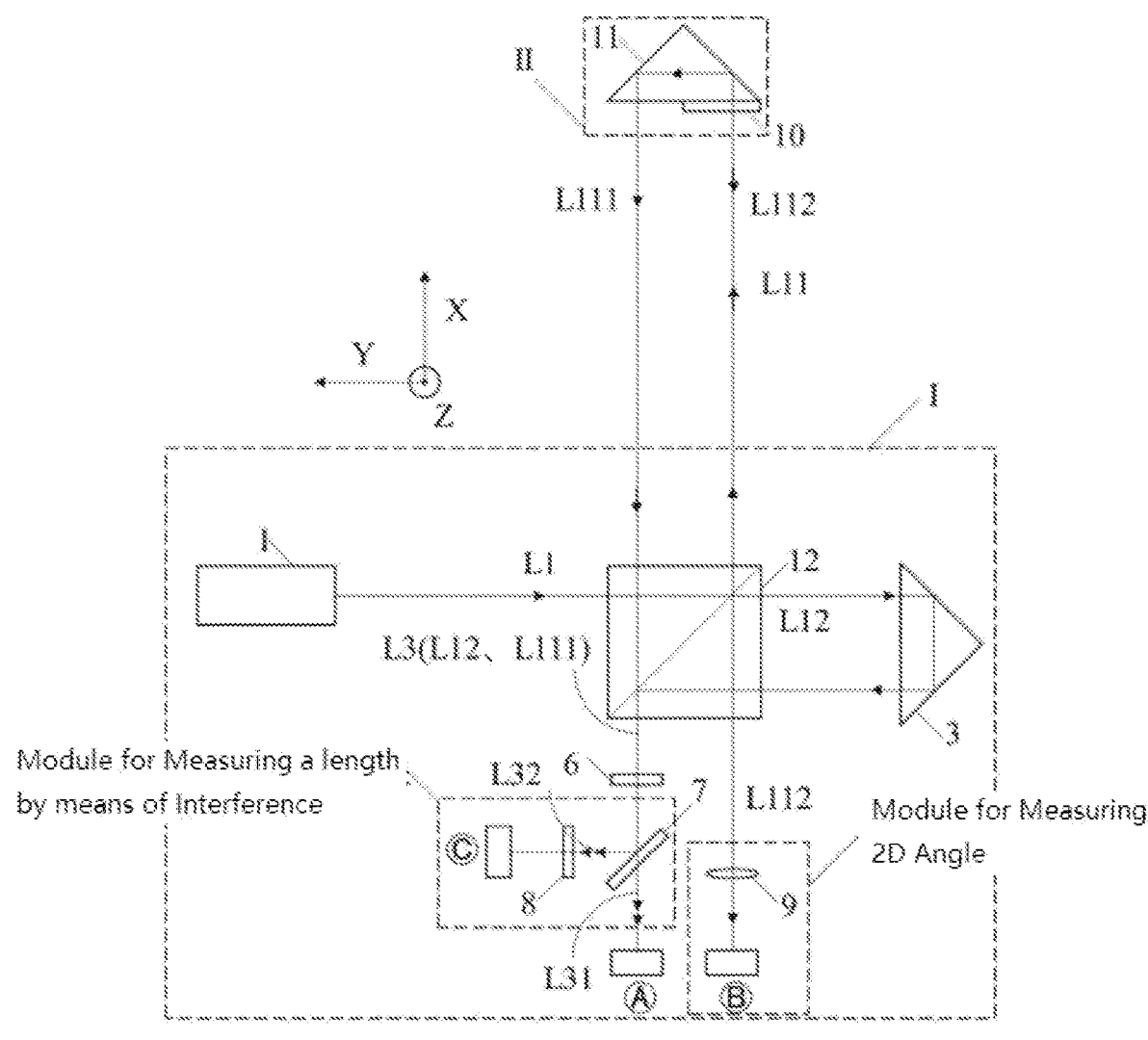
FIG. 5 is a schematic view of a system for simultaneously measuring 5DOF GEs by a single frequency laser with a reflecting sensitive structure according to an embodiment of the present invention.

As shown in FIG. 5, a transmitting sensitive structure is adopted, that is, when an emitting light L1 passes by the non-polarizing beam splitter 12, its reflected light is used as a measuring light L11, the target mirror unit II is set in a direction for the polarizing beam splitter 2 to reflect the light L1, while its transmitted light is used as a reference light L12, the fixed pyramid prism 3 and the first quarter-wave plate 4 is disposed in a direction in which the non-polarizing beam splitter 12 transmits through the light L1.

Figure 6:
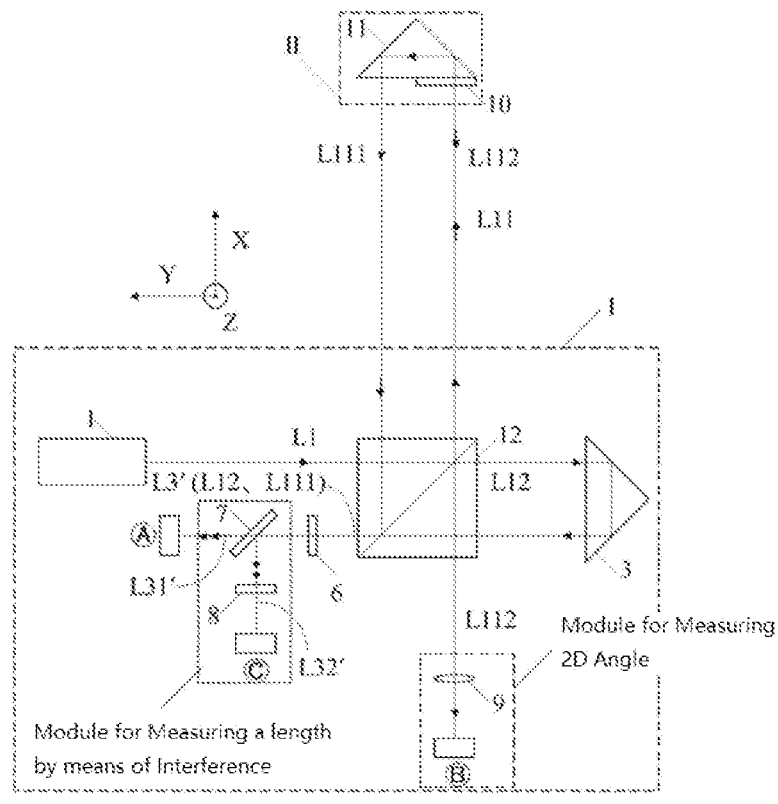
FIG. 6 is a schematic view of a system for simultaneously measuring 5DOF GEs by a single frequency laser with a reflecting sensitive structure according to an embodiment of the present invention.

As shown in FIG. 6, a transmitting sensitive structure is used by setting the first polarizer 6, the interference length measuring module and the first photodetector (A) in a direction for emitting a combined light L3'.

Embodiment 4

Figure 7:
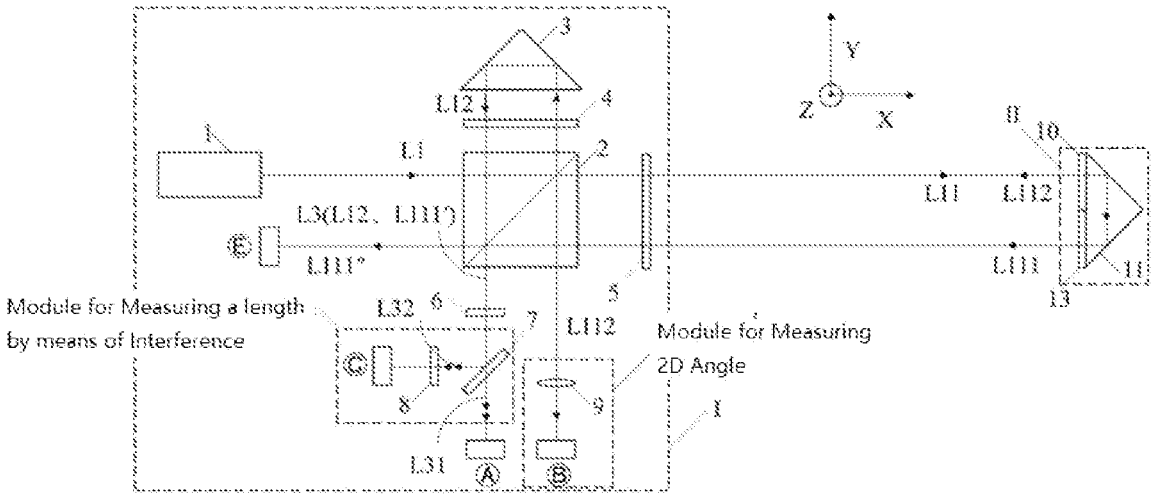
FIG. 7 is a schematic view of a system for simultaneously measuring 6DOF GEs by a single frequency laser with a transmitting sensitive structure according to an embodiment of the present invention.

FIG. 7 is a schematic view of a system for simultaneously measuring 6DOF GEs by a laser according to Embodiment 4 of the present invention, in which a rolling angle measuring unit is added based on Embodiment 1, including adding a fifth photodetector (E) to the measuring unit I; and a target mirror unit II is added a third quarter-wave plate 13. As shown in FIG. 7, according to one aspect of the present invention, there is provided a system for simultaneously measuring 6DOF LGEs by a laser, which is composed of a measuring unit I and a target mirror unit II.

In the target mirror unit II, the added third quarter-wave plate 13 is used to: (1) changing a measuring light L111 reflected backward by a moving pyramid prism 11 from a circularly polarized light to a linearly polarized light, so that the linearly polarized light returns to the measuring unit I and passes by the first quarter-wave plate 4 again, the linearly polarized light is changed back into a circularly polarized light (preferred state) or an elliptical polarized light, and then the measuring light L111 is split by the polarizing beam splitter 2; a ratio of intensity of a reflected light L111' and that of a transmitted light L111" is 1:1 (preferred state) or close to 1:1; (2) the third quarter-wave plate rotates γ around X-axis with respect to the target mirror unit II, then a polarizing direction of the measuring light L111 is also rotated by the same angle γ, light intensities of the reflected light L111' and the transmitted light L111" of the measuring light L111 are both changed, and a rotating angle γ of the target mirror unit II about X-axis is calculated according to the change of direction.

In the measuring unit I, the added fifth photodetector (E) is used to receive the transmitted light L111" of the measuring light L111 passing by the polarizing beam splitter 2; the reflected light L111' of the measuring light L111 is combined with the light L12 so as to form a combined light L3; the light L3 is divided into a light L31 and a light L32, they are received by the first photodetector (A) and the third photodetector (C), respectively.

The present Embodiment 4 provides a method for simultaneously measuring 6DOF LGEs by a laser, which comprises the following steps:

Step 1: measuring a straightness error along Y-axis or Z-axis based on laser autocollimation principle.

Step 1.1: it is consistent with Embodiment 1 and will not be described again.

Step 1.2: a measuring light L11 passes by a second quarter-wave plate 5, a linearly polarized light is changed into a polarized light; the measuring light L11 is emitted from a measuring unit I to hit a target mirror unit II, and is split by a half transmitting and half reflecting mirror 10 of the target mirror unit the transmitted light L111 is reflected back by a moving pyramid prism 11 of the target mirror unit a spatial position of the light L111 drifts with a straightness error of the target mirror unit II along Y-axis or Z-axis; the light L111 carries a 2D straightness error information back to the measuring unit I; by adjusting a third quarter-wave plate 13, the light L111 passing by the third quarter-wave plate 13 again changes from the circularly polarized light to a linearly polarized light so as to pass by a second quarter-wave plate 5, so that the light L111 changes from the linearly polarized light to a circularly polarized light (preferred state) or an elliptical polarized light, then the light L111 is split by the polarizing beam splitter 2 when it passes by the polarizing beam splitter 2 again; a ratio of a light intensity of a reflected light L111' and that of a transmitted light L111" is 1:1 (preferred state) or close to 1:1.

Step 1.3: the reference light L12 passes by the first quarter-wave plate 4, the linearly polarized light is changed into a circularly polarized light; then the reference light L12 is reflected back 180° toward its original direction by the fixed pyramid prism 3 to pass by the first quarter-wave plate 4 again, then the circularly polarized light is changed into a linearly polarized light, but a polarizing direction is rotated by 90°, so that the light L12 can transmit through the polarizing beam splitter when it passes by the polarizing beam splitter again, and is combined with the light L111' reflected by the polarizing beam splitter in Step 1.2, so as to form a combined light L3; then the combined light L3 passes by the first polarizer 6 and the first non-polarizing beam splitter 7, and is finally received by the first photodetector (A).

Steps 1.4 and 1.5: they are the same as those in Embodiment 1 and will not be described again.

Step 2: a position error along X-axis is measured based on a single frequency laser interference, which is consistent with Embodiment 1 and will not be described again.

Step 3: measuring an angle error for rotating around Y-axis or Z-axis based on laser autocollimation, which is consistent with Embodiment 1 and will not be described again.

Step 4: measuring an angle error about X-axis based on a polarization difference light intensity.

Step 4.1: adding a third quarter-wave plate 13 to the target mirror unit the measuring light L111 passing by the third quarter-wave plate 13 returns to measuring unit I, then passes by the second quarter-wave plate 5 again, the measuring light L111 is split when passing by the polarizing beam splitter 2 again; a reflected light L111' is still received by the first photodetector (A) and the third photodetector (C), while the other transmitted light L111" is received by the fifth photodetector (E).

Step 4.2: blocking the measuring light L111, so that only the reference light L12 is received on the first photodetector (A) and the third photodetector (C), light intensities of the first photodetector (A) and the third photodetector (C) are $I_{10}$, $I_{30}$, respectively.

Step 4.3: recovering the measuring light L111; when the target mirror unit II rotates $\gamma$ around X-axis, the third quarter-wave plate 13 rotates $\gamma$ accordingly; when the measuring light L111 passes by the polarizing beam splitter 2 again, its polarizing direction increases by an angle $\gamma'$ with respect to its original polarizing direction; the angle is equal to a rotated angle $\gamma$ of the target mirror unit about X-axis.

Step 4.4: the light L111 of the measuring light passes by the polarizing beam splitter 2 and is split by the polarizing beam splitter 2; a reflected light is finally received by the first photodetector (A) and the third photodetector (C), their light intensities are $I_1(\gamma)$, $I_3(\gamma)$; the other transmitted light is finally received by the fifth photodetector (E), its light intensity is $I_5(\gamma)$, $f(\gamma)=[I_1(\gamma)-I_{10}+I_3(\gamma)-I_{30}-I_5(\gamma)]/[I_1(\gamma)-I_{10}+I_3(\gamma)-I_{30}+I_5(\gamma)]$.

Step 4.5: rotating the target mirror unit II around X-axis by several specific angles, $\gamma_1$, $\gamma_2$, . . . , measuring the corresponding $f(\gamma_1)$, $f(\gamma_2)$, . . . , and calibrating a function curve of $\gamma$ v. $f(\gamma)$.

Step 4.6: measuring light intensities $I_1(\gamma)$, $I_3(\gamma)$, $I_5(\gamma)$ in real time, calculating $f(\gamma)$ according to Step 4.4, and calibrating the function $\gamma$ v. $f(\gamma)$ according to Step 4.5; and calculating a rotation angle $\gamma$ of the target mirror unit II about X-axis.

Embodiment 4 has three other variants.

Figure 8:
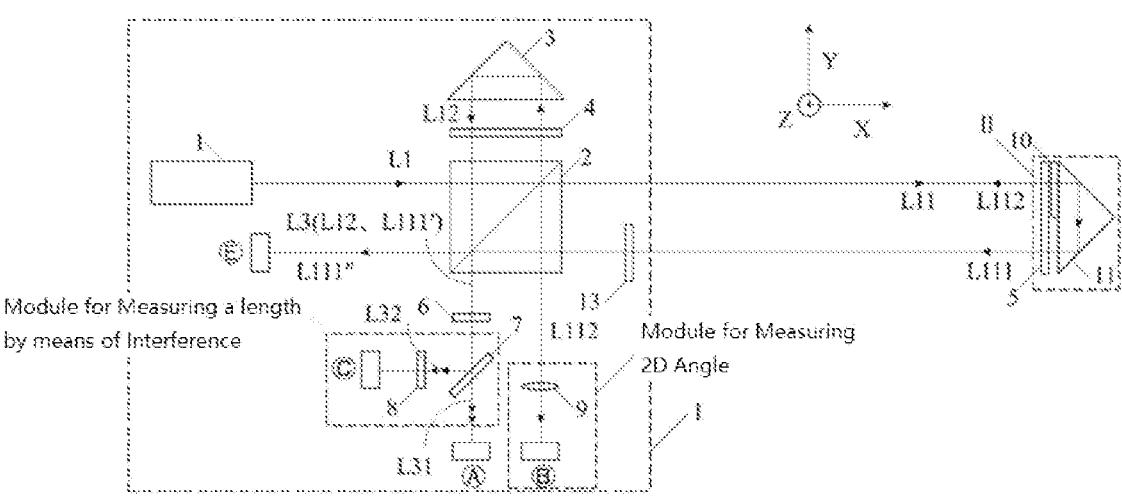
FIG. 8 is a schematic view of a system for simultaneously measuring 6DOF GEs by a single frequency laser with a transmitting sensitive structure according to an embodiment of the present invention.

(1) As shown in FIG. 8, a quarter-wave plate 13 is moved into the measuring unit I, and placed at a position before the measuring light L111 returns to the measuring unit I and hits the polarizing beam splitter 2; a second quarter-wave plate 5 is moved into the target mirror unit II, and placed in front of the half transmitting and half reflecting mirror 10; for convenience, a rolling angle measuring structure as shown in FIG. 7, in which the second quarter-wave plate 5 is placed in the measuring unit I while the third quarter-wave plate 13 is in the target mirror unit II, is called a first rolling angle measuring structure; a rolling angle measuring structure as shown in FIG. 8, in which a second quarter-wave plate 5 is located in the target mirror unit II while a third quarter-wave plate 13 is arranged in the measuring unit I, is referred to as a second rolling angle measuring structure; the measuring light L11 passes by the third quarter-wave plate 13 in the target mirror unit II, then is transmitted by the half transmitting and half reflecting mirror 10, reflected backward by the moving pyramid prism 11, then passes by the third quarter-wave plate 13 again, and returns to the measuring unit I; when the third quarter-wave plate rotates $\gamma$ around X-axis with the target mirror unit II, a polarizing direction of the measuring light L111 is rotated by an angle $\gamma'=2\gamma$, a light intensity change of the reflected light L111' and the transmitted light L111" after the measuring light L111 is split by the vibrating beam splitter 2 is twice that of the first rolling angle measuring structure, and a resolution of an angle $\gamma$ by which the target mirror unit II rotates about X-axis is doubled.

Figure 9:
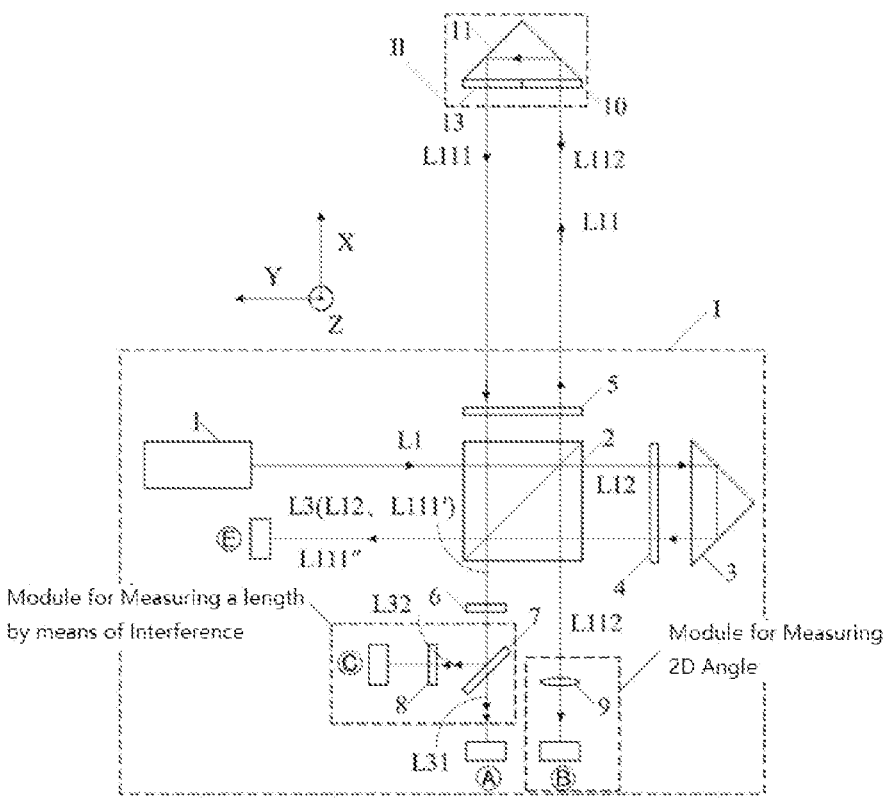
FIG. 9 is a schematic view of a system for simultaneously measuring 6DOF GEs by a single frequency laser with a reflecting sensitive structure according to an embodiment of the present invention.

(2) As shown in FIG. 9, when a reflecting sensitive structure and a first rolling angle measuring structure are adopted, a rolling angle measuring resolution is the same as that of a transmitting sensitive structure and a first rolling angle measuring structure as shown in FIG. 7.

Figure 10:
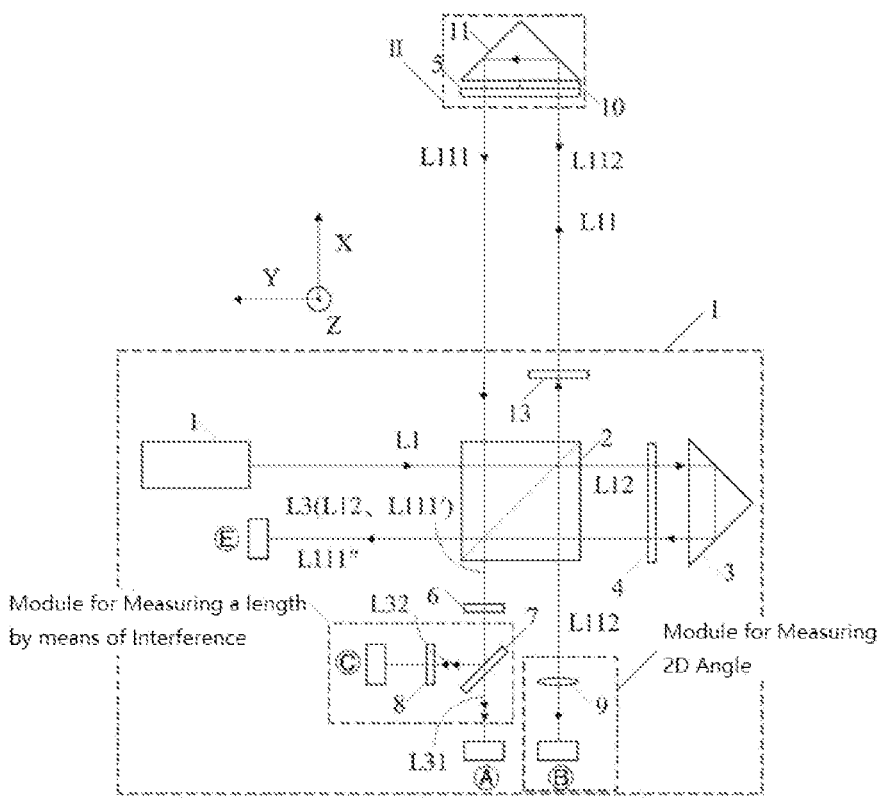
FIG. 10 is a schematic view of a system for simultaneously measuring 6DOF GEs by a single frequency laser with a reflecting sensitive structure according to an embodiment of the present invention.

(3) As shown in FIG. 10, when a reflecting sensitive structure and a second rolling angle measuring structure are adopted, a rolling angle measuring resolution is consistent with that of a transmitting sensitive structure and a second rolling angle measuring structure as shown in FIG. 8.

Embodiment 5

Figure 11:
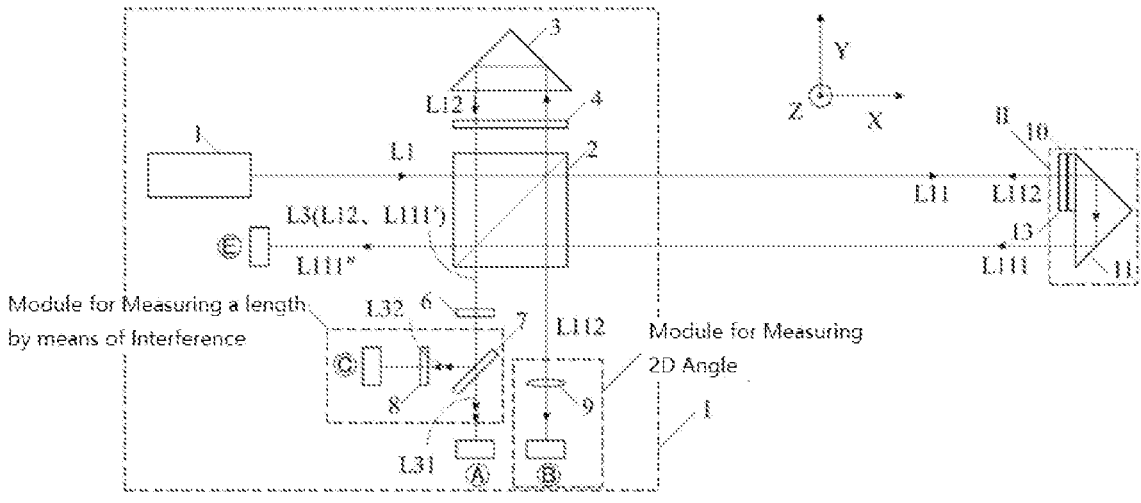
FIG. 11 is a schematic view of a system for simultaneously measuring 6DOF GEs by a single frequency laser with a transmitting sensitive structure according to an embodiment of the present invention.

FIG. 11 is a schematic view of a system for simultaneously measuring 6DOF GEs by a laser according to Embodiment 5 of the present invention. As shown in FIG. 11, according to one aspect of the present invention, there is provided a system for simultaneously measuring 6DOF LGEs by a laser, which is composed of a measuring unit I and a target mirror unit II.

Differing from the system of Embodiment 7, as shown in FIG. 7, the measuring unit I is without a second quarter-wave plate 5, while a third quarter-wave plate 13 of the target mirror unit II moves before the half transmitting and half reflecting mirror 10, so as to form a third rolling angle measuring structure, in which the third quarter-wave plate 13 of the target mirror unit II replaces the second quarter-wave plate 5 in the measuring unit I of Embodiment 7, to change polarizing directions of a linear GE measuring light L111 and a two-dimensional angle measuring light L112, so that: (1) when the two-dimensional angle measuring light L112 passes by the polarizing beam splitter 2 again, it is reflected by the polarizing beam splitter 2; (2) when the measuring light L111 passes by the polarizing beam splitter 2 again, it is split by the polarizing beam splitter 2; a reflected light L111' and a transmitted light L111" have a ratio of about 1:1 in light intensities; (3) when measuring, the third quarter-wave plate rotates $\gamma$ around X-axis with the target mirror unit II, then a polarizing direction of the measuring light L111 is rotated by an angle $\gamma'=\gamma$, to make light intensities of the reflected light L111' and the transmitted light L111" of the measuring light L111 changed, so a rotation angle $\gamma$ of the target mirror unit II about X-axis can be calculated according to the change.

Figure 12:
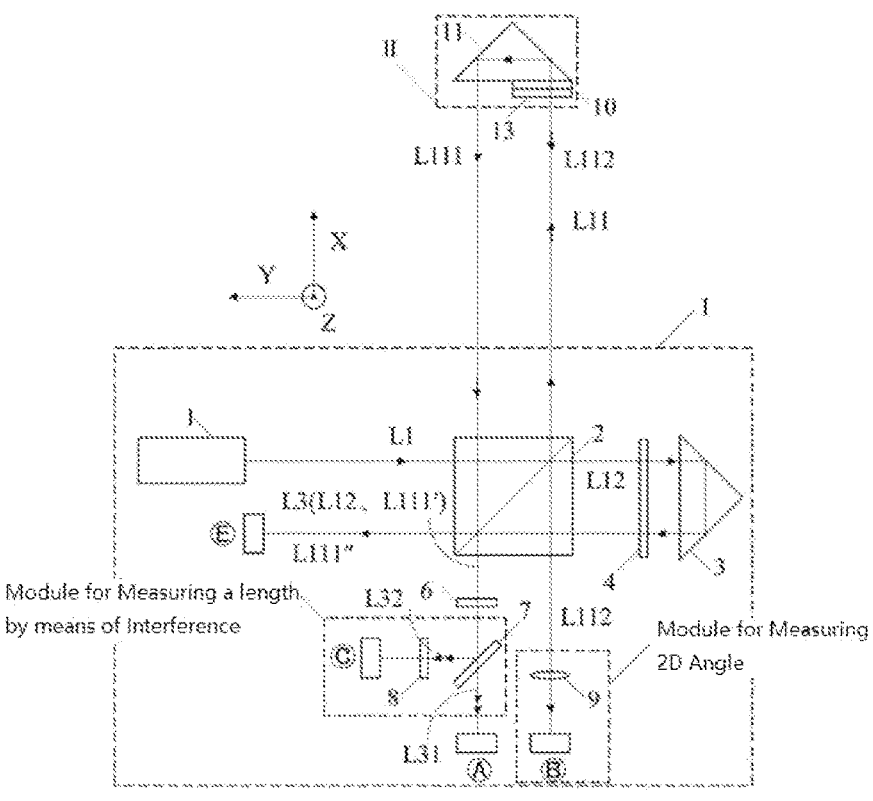
FIG. 12 is a schematic view of a system for simultaneously measuring 6DOF GEs by a single frequency laser with a reflecting sensitive structure according to an embodiment of the present invention.

Embodiment 5 has another variant. As shown in FIG. 12, a reflecting sensitive structure and a third rolling angle measuring structure are adopted, its rolling angle measuring resolution is the same as that of the transmitting sensitive structure and the third rolling angle measuring structure as shown in FIG. 11.

Embodiment 6

Figure 13:
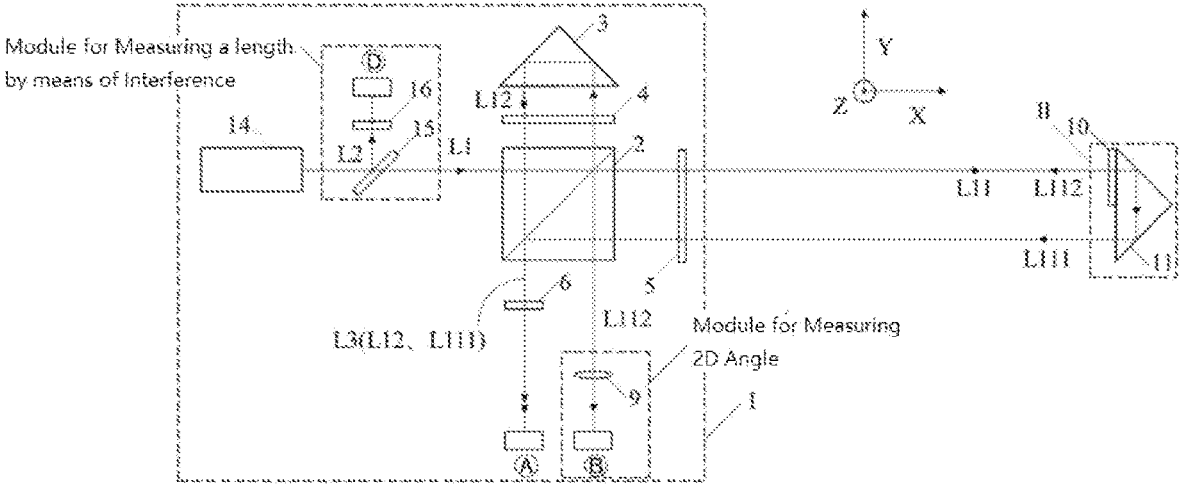
FIG. 13 is a schematic view of a system for simultaneously measuring 5DOF GEs by a dual frequency laser with a transmitting sensitive structure according to an embodiment of the present invention.

FIG. 13 is a schematic view of a system for simultaneously measuring 5DOF GEs by a laser according to Embodiment 13 of the present invention. As shown in FIG. 13, according to one aspect of the present invention, a system for simultaneously measuring 5DOF GEs by laser is provided with a measuring unit I and a target mirror unit II.

The measuring unit I includes a dual frequency laser 14, a polarizing beam splitter 2, a fixed pyramid prism 3, a first quarter-wave plate 4, a second quarter-wave plate 5, a first polarizer 6, a focusing lens 9, a third non-polarizing beam splitter 15, a second polarizer 16, a first photodetector (A), a second photodetector (B), and a fourth photodetector (D). The dual frequency laser 14 constitutes a laser emitting module. The third non-polarizing beam splitter 15, the second polarizer 16, and the fourth photodetector (D) constitute an interference length measuring module. The focusing lens 9 and the second photodetector (B) constitute a two-dimensional angle measuring module.

The target mirror unit II includes a half transmitting and half reflecting mirror 10 and a moving pyramid prism 11, which are consistent with Embodiment 1.

In the measuring unit I, the dual frequency laser 14 is used to generate an emitting light L1, and the emitting light L1 is a polarized light with two beams. The two beams are spatially superposed with a certain frequency difference, and the two beams have polarizing directions perpendicular to each other;

the third non-polarizing beam splitter 15 is disposed between the dual frequency laser 14 and the polarizing beam splitter 2; the emitting light L1 is split by the third non-polarizing beam splitter 14, including an emitted light in its original direction, and a reflected light L2;

the second polarizer 16 is arranged between the third non-polarizing beam splitter 15 and the fourth photodetector (D); by adjusting a polarizing axis direction of the second polarizer 16, the reflected light L2 interferes after passing by the second polarizer 16, and an interference spot is received by the fourth photodetector (D) as a reference signal for heterodyne interference length measurement;

the fourth photodetector (D) is used to receive an interference spot of a light L2 as a standard signal (or called a reference signal) for the heterodyne interference length measurement.

A direction of a polarizing axis of the first polarizer 6 is adjusted, to make the combined beam L3 interferes after passing by the first polarizer 6, an interference spot is received by the first photodetector (A) as a measuring signal of the heterodyne interference length measurement; a displacement of the target mirror unit along X-axis is calculated according to the reference signal/the standard signal, and the measuring signal.

The polarizing beam splitter 2, the fixed pyramid prism 3, the first quarter-wave plate 4, the second quarter-wave plate 5, the first polarizer 6, the focusing lens 9, the first photodetector (A), and the second photodetector (B) have the same functions as those of Embodiment 1, and will not be described again.

The present embodiment 6 provides a method for simultaneously measuring 5DOF GEs by a laser, which comprises the following steps:

Step 1: measuring a straightness error along Y-axis or Z-axis based on laser autocollimation principle.

Step 1.1: when an emitting light L1 of a dual frequency laser 14 passes by a polarizing beam splitter 2, it is divided into a measuring light L11 and a reference light L12, the measuring light L11 transmits through the polarizing beam splitter 2, while the reference light L12 is reflected by the polarizing beam splitter 2; the measuring light L11 and the reference light L12 are both a linearly polarized light, and polarizing directions thereof are perpendicular to each other.

Step 1.2: it is consistent with Embodiment 1 and will not be described again.

Step 1.3: the reference light L12 passes by the first quarter-wave plate 4, its linearly polarized light is changed into a circularly polarized light; the reference light L12 is reflected back 180° toward its original direction by a fixed pyramid prism 3 and passes by the first quarter-wave plate 4 again, the circularly polarized light is changed back into a linearly polarized light, but its polarizing direction is rotated by 90°, so that the light L12 becomes transmitted through the polarizing beam splitter when it passes by the polarizing beam splitter again, and is combined with the light L111 reflected by the polarizing beam splitter in Step 1.2, so as to form a combined light L3, then the combined light L3 passes by the first polarizer 6, and is finally received by the first photodetector (A).

Steps 1.4 and 1.5: they are the same as those in Embodiment 1 and will not be described again.

Step 2: measuring a position error along X-axis based on a dual frequency laser interference.

Step 2.1: the emitting light L1 has two polarized beams with a certain frequency difference, frequencies of the two beams are $f_1$, $f_2$, respectively, and when they are separated by the polarizing beam splitter 2, a frequency of the measuring light L11 is $f_1$, while a frequency of the reference light L12 is $f_2$.

Step 2.2: a displacement of the measuring light L111 along X-axis of the target mirror unit is $\lambda x$, a frequency variation due to Doppler effect is $f(\Delta x)$, a frequency of the measuring light L111 is $f_1 + f(\Delta x)$.

Step 2.3: a first polarizer 6 is arranged in front of the first photodetector (A); by adjusting a polarizing axis direction of a polarizer, a combined beam L3 (including a light L12 and a light L111) interferes after passing through the first polarizer 6; an interference spot is received by the first photodetector (A) as a measuring signal of a heterodyne interference length measurement, and a frequency of the measuring signal is $f_m = f_1 + f(\Delta x) - f_2$.

Step 2.4: when the emitting light L1 passes by the third non-polarizing beam splitter 15, another laser beam L2 is formed in a reflecting direction of the third non-polarizing beam splitter 15; the light L2 also contains two polarized lights with a certain frequency difference; the light L2 interferes after passing by the second polarizer 16; an interference spot is received by the fourth photodetector (D) as a standard signal for the heterodyne interference length measurement, and a frequency of the standard signal is $f_s = f_1 - f_2$.

Step 2.5: the measured signal frequency ($f_m = f_1 + f(\Delta x) - f_2$) obtained in Step 2.3 subtracts the standard signal frequency ($f_s = f_1 - f_2$) obtained in Step 2.4 to obtain $f(\Delta x) = f_m - f_s$, a number of light and dark changes of interference fringes caused by f($\Delta$x) is N($\Delta$x), a laser emitting laser wavelength is $\lambda$, so a displacement of the target mirror unit along X-axis $\Delta$x=N($\Delta$x)·$\lambda$/2.

Step 3: measuring an angle error for rotating around Y-axis or Z-axis based on laser autocollimation, which is consistent with Embodiment 1 and will not be described again.

In practical applications, the above Steps 1, 2 and 3 can be changed in their order.

Figures 14, 15:
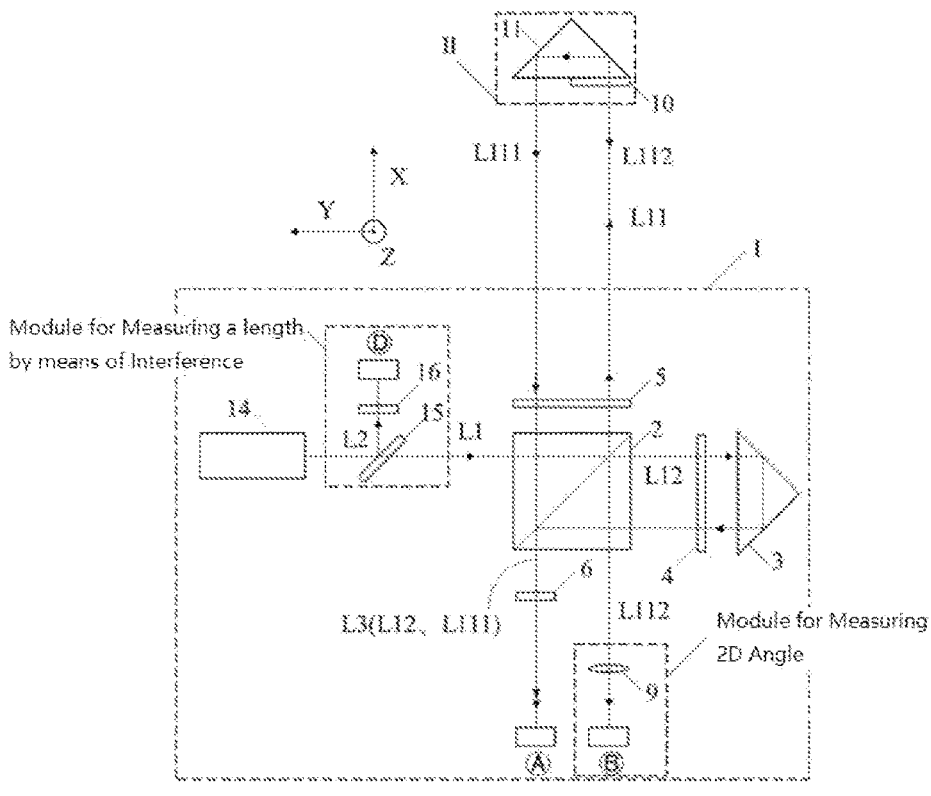
FIG. 14 is a schematic view of a system for simultaneously measuring 5DOF GEs by a dual frequency laser with a reflecting sensitive structure according to an embodiment of the present invention.
FIG. 15 is a schematic view of a system for simultaneously measuring 6DOF GEs by a dual frequency laser with a transmitting sensitive structure according to an embodiment of the present invention.

In Embodiment 6, a reflecting sensitive structure as shown in FIG. 14 can be used, so as to realize simultaneously measuring 5DOF GEs by a laser.

Embodiment 7

FIG. 15 is a schematic view of a system for simultaneously measuring 6DOF GEs by a laser according to Embodiment 7 of the present invention. The system adds a rolling angle measuring unit to the measuring system as shown in FIG. 13 of Embodiment 6, including adding a fifth photodetector (E) to the measuring unit I; and adding a third quarter-wave plate 13 in the target mirror unit II. That is, the system structure combines a dual frequency length measuring, transmitting sensitive structure and the third rolling angle measuring structure.

As shown in FIG. 15, according to one aspect of the present invention, there is provided a system for simultaneously measuring 6DOF LGEs by a laser, including a measuring unit I and a target mirror unit II.

The present embodiment 7 provides a method for simultaneously measuring 6DOF LGEs by a laser, which comprises the following steps:

Step 1: measuring a straightness error along Y-axis or Z-axis based on laser autocollimation principle.

Step 1.1: it is the same as Embodiment 6 and will not be described again.

Step 1.2: it is the same as Embodiment 4 and will not be described again.

Step 1.3: the reference light L12 passes by the first quarter-wave plate 4, its linearly polarized light is changed into a circularly polarized light, then the reference light L12 is reflected back 180° toward its original direction by the fixed pyramid prism 3 and passes by the first quarter-wave plate 4 again, the circularly polarized light is changed back into a linearly polarized light, but its polarizing direction is rotated by 90°, so that the light L12 transmits through the polarizing beam splitter when it passes by the polarizing beam splitter again, and is combined with the light L111' reflected by the polarizing beam splitter in Step 1.2, so as to form a combined light L3, and then the combined light L3 is finally received by the first optoelectrical detector (A) after passing through the first polarizer 6.

Steps 1.4 and 1.5: they are the same as those in Embodiment 1 and will not be described again.

Step 2: measuring a position error along X-axis based on a dual frequency laser interference.

Steps 2.1 and 2.2: they are the same as those in Embodiment 6 and will not be described again.

Step 2.3: setting a first polarizer 6 in front of the first photodetector (A); by adjusting a polarizing axis direction of the polarizer, a combined beam L3 (including a light L12 and light L111') interferes after passing by the first polarizer 6; an interference spot is received by the first photodetector (A) as a measuring signal of a heterodyne interference length measurement, a frequency of the measuring signal is $f_m$=$f_1$+f($\Delta$x)−$f_2$.

Steps 2.4 and 2.5: they are the same as those in Embodiment 6 and will not be described again.

Step 3: measuring an angle error for rotating around Y-axis or Z-axis based on laser autocollimation, which is consistent with Embodiment 1 and will not be described again.

Step 4: measuring an angle error about X-axis based on a polarization difference light intensity.

Step 4.1: adding a third quarter-wave plate 13 in the target mirror unit II; the measuring light L111 passes by the third quarter-wave plate 13 to return to measuring unit I, then passes by second quarter-wave plate 5 again, the measuring light L111 is split when passing through the polarizing beam splitter 2; a reflected light L111' is still received by the first photodetector (A), while the other transmitted light L111" is received by the fifth photodetector (E).

Step 4.2: blocking the measuring light L111, so that the reference light L12 is only received on the first photodetector (A), a light intensity of the first photodetector (A) is $I_{10}$.

Step 4.3: it is the same as Embodiment 4 and will not be described again.

Step 4.4: the light L111 of the measuring light passes by the polarizing beam splitter 2 and is split by the polarizing beam splitter 2; a reflected light is finally received by the first photodetector (A), its light intensity is $I_1$($\gamma$), the other transmitted light is finally received by the fifth photodetector (E) and its light intensity is $I_5$($\gamma$), f($\gamma$)=[$I_1$($\gamma$)−$I_{10}$−$I_5$($\gamma$)]/[$I_1$($\gamma$)−$I_{10}$+$I_5$($\gamma$)].

Step 4.5: it is the same as Embodiment 4 and will not be described again.

Step 4.6: measuring light intensities $I_1$($\gamma$), $I_5$($\gamma$) in real time, calculating f($\gamma$) according to Step 4.4, calibrating f($\gamma$) v. $\gamma$ according to Step 4.5, and calculating a rotated angle $\gamma$ of the target mirror unit II about X-axis.

Embodiment 7 has the following 5 variants.

Figure 16:
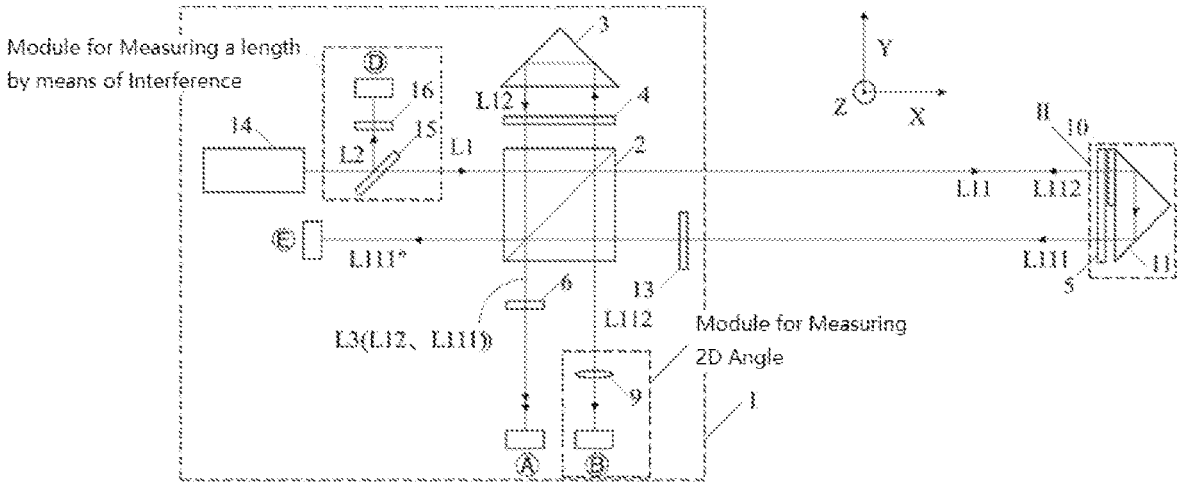
FIG. 16 is a schematic view of a system for simultaneously measuring 6DOF GEs by a dual frequency laser with a transmitting sensitive structure according to an embodiment of the present invention.

(1) As shown in FIG. 16, with a transmitting sensitive structure and a second rolling angle measuring structure, a rolling angle measuring resolution is twice that of a transmitting sensitive structure and a first rolling angle measuring structure as shown in FIG. 15.

Figure 17:
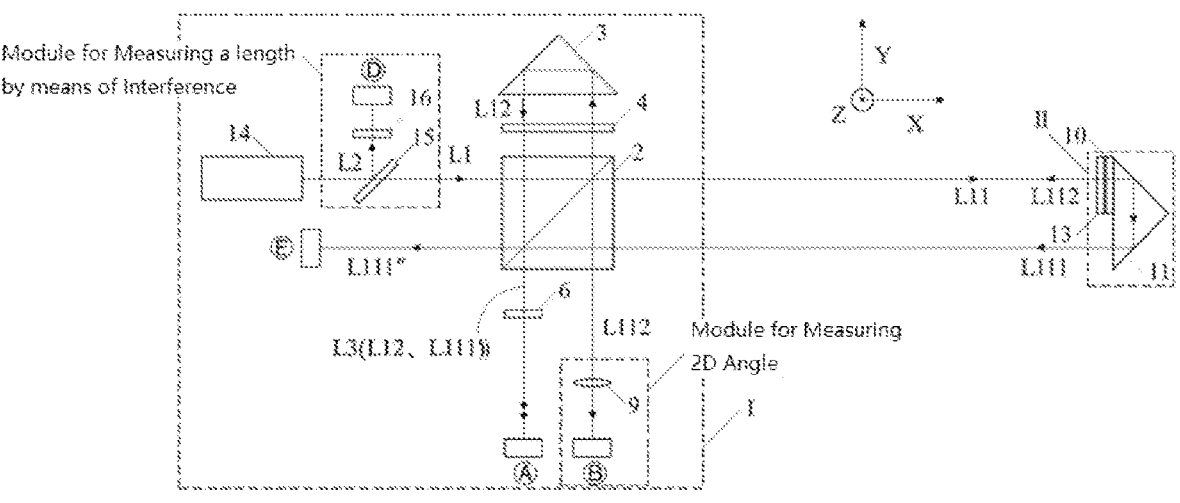
FIG. 17 is a schematic view of a system for simultaneously measuring 6DOF GEs by a dual frequency laser with a transmitting sensitive structure according to an embodiment of the present invention.

(2) As shown in FIG. 17, a transmitting sensitive structure and a third rolling angle measuring structure are adopted, and a rolling angle measuring resolution is the same as that of a transmitting sensitive structure and a first rolling angle measuring structure as shown in FIG. 15.

Figure 18:
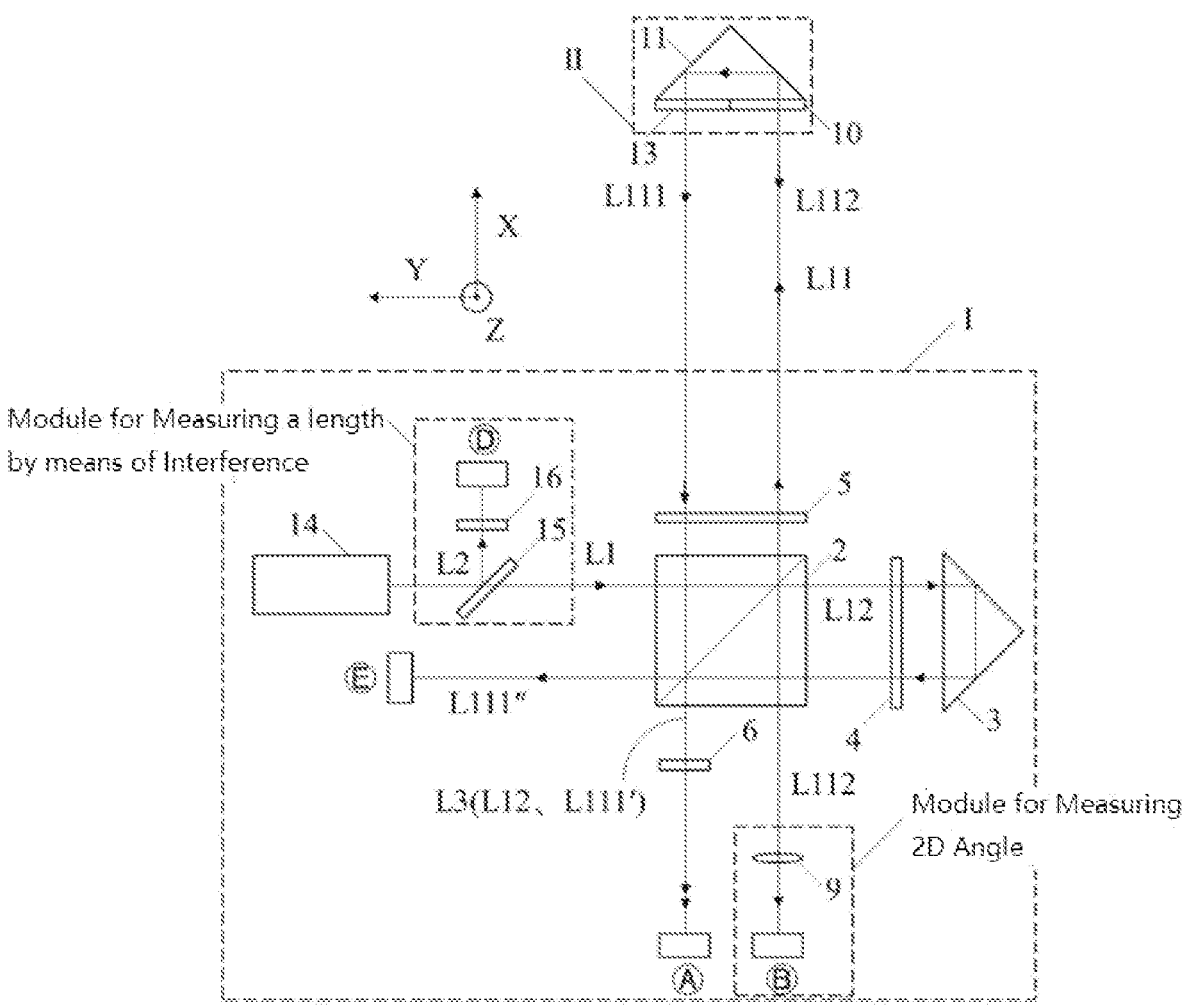
FIG. 18 is a schematic view of a system for simultaneously measuring 6DOF GEs by a dual frequency laser with a reflecting sensitive structure according to an embodiment of the present invention.

(3) As shown in FIG. 18, a reflecting sensitive structure and a first rolling angle measuring structure are adopted, and a rolling angle measuring resolution is the same as that of a transmitting sensitive structure and a first rolling angle measuring structure as shown in FIG. 15.

Figure 19:
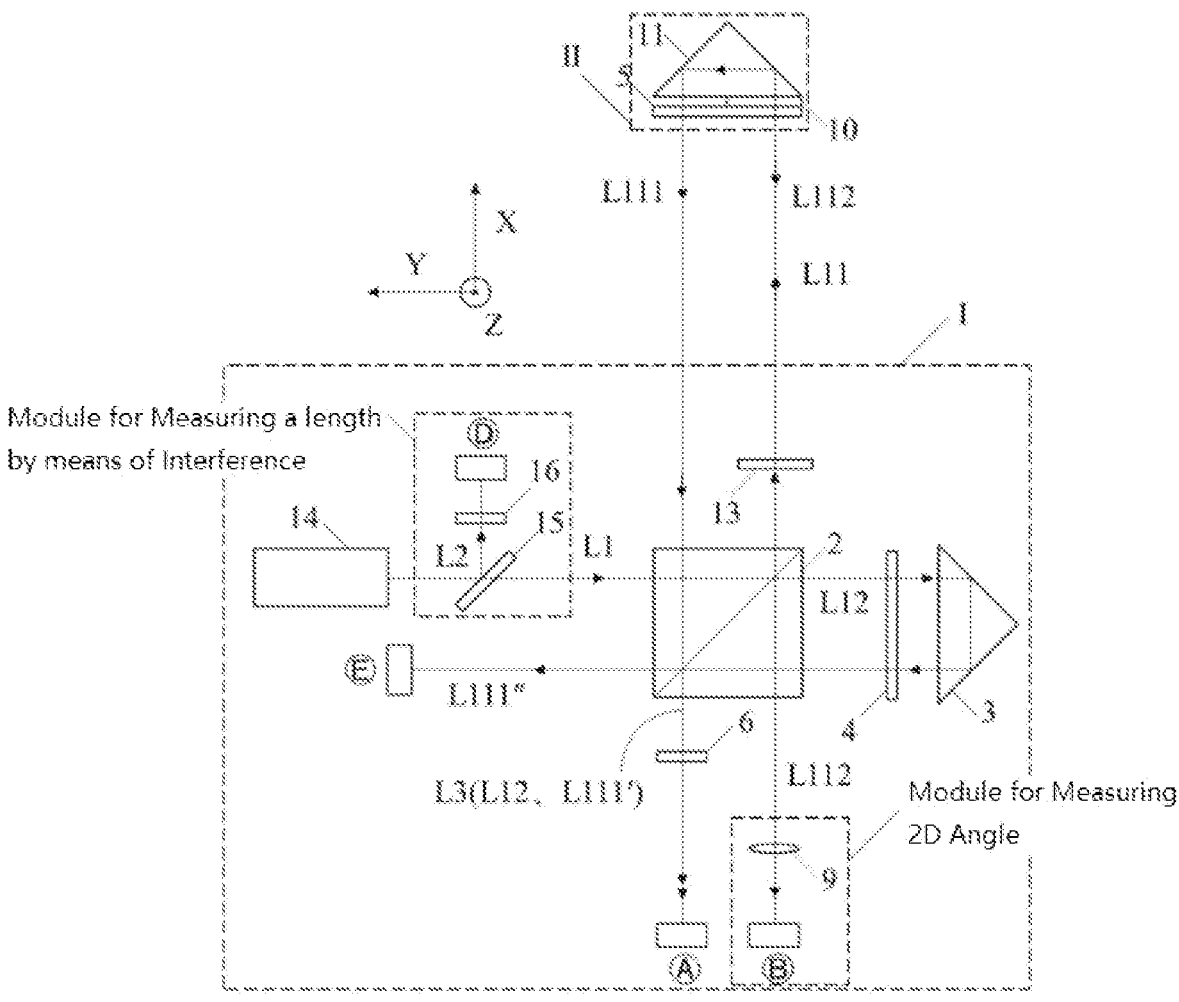
FIG. 19 is a schematic view of a system for simultaneously measuring 6DOF GEs by a dual frequency laser with a reflecting sensitive structure according to an embodiment of the present invention.

(4) As shown in FIG. 19, with a reflecting sensitive structure and a second rolling angle measuring structure, a rolling angle measuring resolution is twice that of a transmitting sensitive structure and a first rolling angle measuring structure as shown in FIG. 15.

Figure 20:
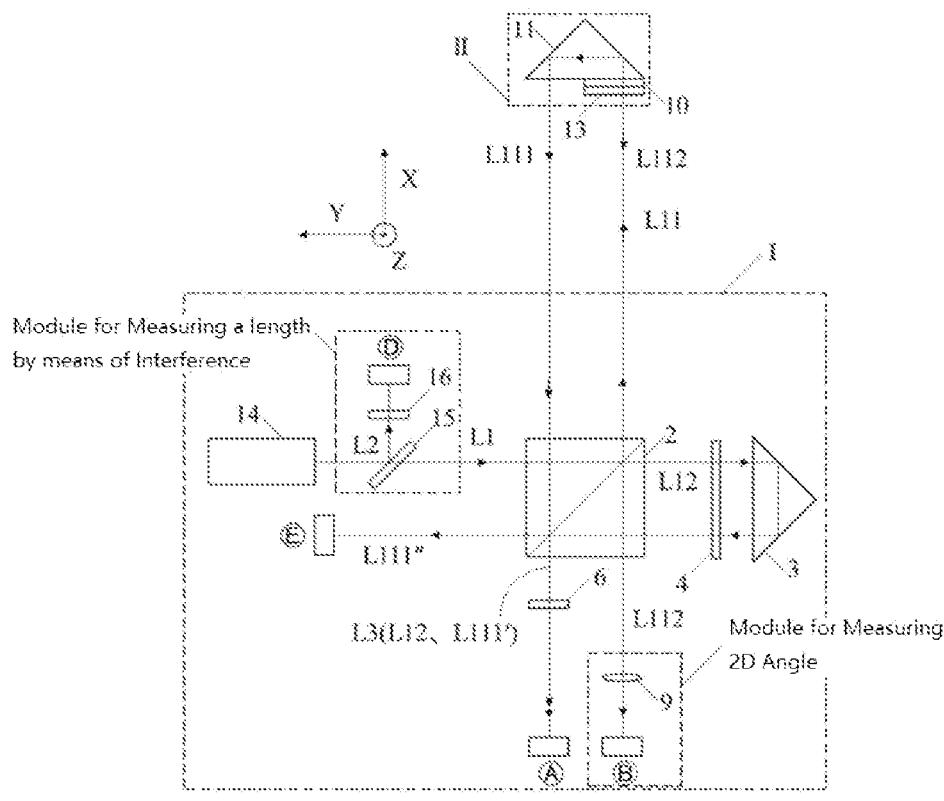
FIG. 20 is a schematic view of a system for simultaneously measuring 6DOF GEs by a dual frequency laser with a reflecting sensitive structure according to an embodiment of the present invention.

(5) As shown in FIG. 20, a reflecting sensitive structure and a third rolling angle measuring structure are adopted, and a rolling angle measuring resolution is the same as that of a transmitting sensitive structure and a first rolling angle measuring structure as shown in FIG. 15.

Embodiment 8

Figure 21:
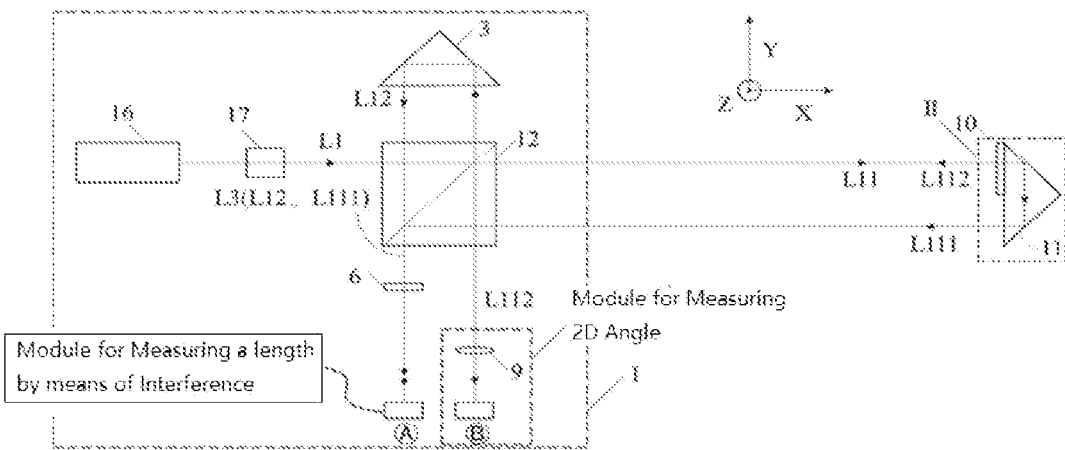
FIG. 21 is a schematic view of a system for simultaneously measuring 5DOF GEs by a multiple wavelength laser with a transmitting sensitive structure according to an embodiment of the present invention.

As shown in FIG. 21, according to one aspect of the present invention, there is provided a system for simultaneously measuring 5DOF GEs by a laser, comprising a measuring unit I and a target mirror unit II.

The measuring unit I includes a multi wavelength laser light source 16, a heterodyne frequency generating module 17, a second non-polarizing beam splitter 12, a fixed pyramid prism 3, a first polarizer 6, a focusing lens 9, a first photodetector (A), a second photodetector (B), a first bandpass filter 18, a second bandpass filter 19, a third bandpass filter 20, a first phase detector 21, a second phase detector 22, and a third phase detector 23. The multi wavelength laser light source 16 and the heterodyne frequency generating module 17 constitute a laser emitting module. The first bandpass filter 18, the second bandpass filter 19, the third bandpass filter 20, the first phase detector 21, the second phase detector 22, and the third phase detector 23 constitute an interference length measuring module. The focusing lens 9 and the second photodetector (B) constitute a two-dimensional angle measuring module.

The target mirror unit II includes a half transmitting and half reflecting mirror 10 and a moving pyramid prism 11, which is consistent with Embodiment 1.

In the measuring unit I, the multi wavelength laser light source 16 is used to generate an emitting light L1, and the emitting light L1 has a multi wavelength laser $\lambda_1$, $\lambda_2$, $\lambda_3$, their frequencies are $v_1$, $v_2$, $v_3$;

the heterodyne frequency generating module 17 is configured to change a frequency of the emitting light L1 to $v_1+f_1$, $v_2+f_2$, $v_3+f_3$.

The non-polarizing beam splitter 12 is used for: (1) beam splitting: splitting the emitting light L1 into a measuring light L11 and a reference light L12. The measuring light L11 is incident on the target mirror unit and is reflected back by the target mirror unit as a light L111 which carries a 3DOF LGE signal back to the measuring unit as a measuring light. The reference light L12 only propagates inside the measurement unit; (2) beam combining: the reference light L12 is transmitted through the non-polarizing beam splitter 12 when it passes by the same again, and the measuring light L111 is reflected by the target mirror unit, so that the two beams are superposed together in a spatial position, so as to form a combined light L3; (3) beam separating: separating the light L112 reflected by the beam splitter in the target mirror unit from the measuring light L11, as a two-dimensional angle measuring light.

The first polarizer 6 is arranged between the second non-polarizing beam splitter 12 and the first photodetector (A). By adjusting a direction of the polarizing axis of the first polarizer 6, the combined beam L3 interferes after passing through the first polarizer 6.

The first photodetector (A) is used to receive the combined light L3 so as to realize: (1) calculating a straightness error of the target mirror unit II along Y-axis or Z-axis according to a spot offset of light L111 on the first photodetector (A); (2) coordinating with an interference length measuring module to measure a position error of the target mirror unit II along X-axis.

A response spectrum of the first photodetector (A) cannot reach an optical frequency, and a measured heterodyne interference signal spectrum of the combined light L3 only contains components $f_1$, $f_2$, $f_3$. The first to third band-pass filters of the interference length measuring module separate the components $f_1$, $f_2$, $f_3$ of the first photodetector (A) and measure phase information $\varphi_1$, $\varphi_2$, $\varphi_3$ corresponding to each wavelength by the first to third phase detectors. Take two pairs of beat signals, and calculate a displacement $\Delta x$ of the target mirror unit along X-axis according to two pairs of combined wavelengths and two pairs of phase difference.

The present embodiment 8 provides a method for simultaneously measuring 5DOF GEs by a laser, which comprises the following steps:

Step 1: measuring a straightness error along Y-axis or Z-axis based on laser autocollimation principle.

As the multi wavelength laser light source 16 is used, the emitting light L1 includes multi wavelength laser beams $\lambda_1$, $\lambda_2$, $\lambda_3$. However, when measuring a straightness error along Y-axis or Z-axis with the laser autocollimation principle, only a spot position on a detector is detected, which is not different from measurement with a single frequency laser. It is consistent with Embodiment 1 and will not be described again.

Step 2: measuring a position error along X-axis based on a multi wavelength laser interference.

Step 2.1: the emitting light L1 emitted from the multi wavelength laser light source 16 includes multi wavelength laser lights $\lambda_1$, $\lambda_2$, $\lambda_3$, their frequencies are $v_1$, $v_2$, $v_3$; after passing through the heterodyne frequency generating module 17, frequencies of the multi wavelength laser become $v_1+f_1$, $v_2+f_2$, $v_3+f_3$.

Step 2.2: the emitting light L1 is split into a measuring light L11 and a reference light L12 by a non-polarizing beam splitter 12; both the measuring light L11 and the reference light L12 contain multi wavelength laser light $v_1+f_1$, $v_2+f_2$, $v_3+f_3$.

Step 2.3: the measuring light L11 is emitted from the measuring unit I to hit the target mirror unit II, and is reflected back 180° toward its original direction by the half transmitting and half reflecting mirror 10 of the target mirror unit II. The retroreflected light L111 carries straightness error information along X-axis and returns to the measuring unit I as a measuring light of the heterodyne interference length measuring signal.

Step 2.4: the reference light L12 is reflected back 180° toward its original direction by the fixed pyramid prism 3 of the measuring unit I, passes by the non-polarizing beam splitter 12, its transmitted part is combined with a reflected part of the light L111 when passing by the non-polarizing beam splitter 12, so as to form a combined light L3; by adjusting a polarizing axis direction of the first polarizer 6, the combined light L3 passes through the first polarizer 6, and interference occurs on the first photodetector (A).

Step 2.5: the first photodetector (A) detects components $f_1$, $f_2$, $f_3$ of the heterodyne interference signal spectrum; the first to third band-pass filters 18-20 separate the components $f_1$, $f_2$, $f_3$, and the first to third phase detectors 21-23 measure phase information $\varphi_1$, $\varphi_2$, $\varphi_3$ corresponding to each wavelength. Take two pairs of beat signals, and calculate a displacement $\Delta x$ of the target mirror unit II along X-axis according to two pairs of combined wavelengths and two pairs of phase difference.

Embodiment 8 has the following three variants.

Figure 22:
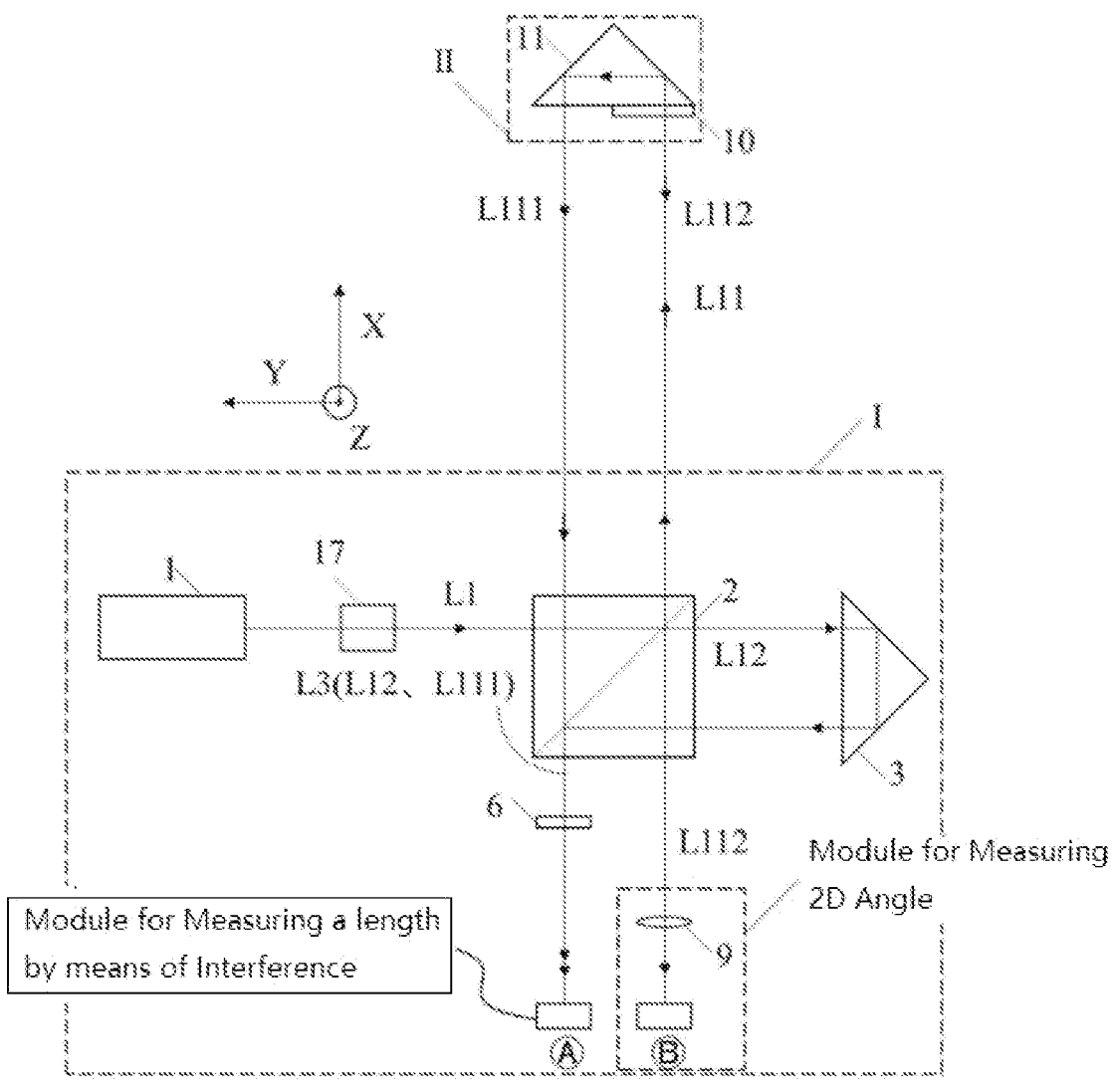
FIG. 22 is a schematic view of a system for simultaneously measuring 5DOF GEs by a multiple wavelength laser with a reflecting sensitive structure according to an embodiment of the present invention.

As shown in FIG. 22, a reflecting sensitive structure is adopted.

With a transmitting sensitive structure, a reflected part when the light L12 passes by the second non-polarizing beam splitter 12 for the second time and a transmitted part when the light L111 passes by the second non-polarizing beam splitter 12 are combined to form a light L3', the first polarizer 6 and the first photodetector (A) are arranged in an emitting direction of the combined light L3'.

With a reflecting sensitive structure, a reflected part when the light L12 passes by the second non-polarizing beam splitter 12 again and a transmitted part when the light L111 passes by the second non-polarizing beam splitter 12 are combined to form a light L3', and the first polarizer 6 and the first photodetector (A) are arranged in an emitting direction of the combined light L3'.

To sum up, the system according to the embodiments of the present invention can rapidly measure the 5/6DOF GEs of a space object moving linearly along the linear axis; and longtime monitor relative changes of 5/6DOF position and attitude of two objects in space.

In each embodiment of this specification, there is provided a system and a method for quickly measuring the 5/6DOF GEs of a space object at the same time when the target mirror unit moves linearly along the linear axis. After completing an optical path debugging, the systems in all embodiments can also (1) keep the target mirror unit II stationary, but linearly move the measuring unit I and the space object along the linear axis, so as also realize the simultaneous and rapid measurement of the 5/6DOF GEs of a space object; (2) by keeping the measuring unit I and the target mirror unit II stationary, monitor data measured by the measuring unit for a long time, thus long-term monitoring relative changes of 5/6DOF position and attitude of the two objects in a space.

In the case of a multi wavelength measurement, it is a real single detector measurement. In a single frequency and a double frequency length measurement, at least one detector needs to be equipped for auxiliary measurement. In the present invention, by a first photodetector (A) cooperating with different interference length measuring modules, and by a target mirror composed of a single optical component and a single detector, it is the first time in the world to realize measuring 3 linear errors (i.e., three straightness errors of translation in X, Y and Z directions) at the same time, and further, it is the first time to realize simultaneously measuring 5/6DOF errors based on a single prism and a single target mirror. When a single frequency laser and a dual frequency laser are used for measurement, a quarter wave plate and a rolling angle measuring module can be added to measure three linear errors and rolling angle errors based on a single detector. Based on the above two reasons, the following beneficial effects can be obtained: (1) simplifying an optical path structure, reducing a complexity of measuring system and a volume of a measuring unit and a target mirror unit, so as to facilitate practical applications; (2) reducing a number of detectors so as to reduce circuit power consumption, reduce heat dissipation, improve stability of a measurement system, and reduce cost of a measuring system.

The present invention can simultaneously measure the 5DOF or 6DOF errors, and greatly improve measuring efficiency compared with a single DOF measuring systems and methods in prior art.

A rolling angle is measured according to a polarizing intensity difference, which has a simple measurement principle, high measuring sensitivity and accuracy.

Those skilled in the art can understand that the drawings are only schematic view of an embodiment, so the modules or processes in the drawings maybe not necessary to implement the present invention.

As can be seen from the description of the above embodiments, those skilled in the art can clearly understand that the present invention can be realized with software and necessary general hardware platform. Based on this understanding, a technical solution of the present invention can be embodied in the form of a software product, which can be stored in a storage medium, such as ROM/RAM, magnetic disk, optical disk, etc., which includes several instructions for causing a computer device (which may be a personal computer, a server, or a network component, etc.) to perform the method described in each embodiment or some part of the embodiments of the present invention.

The above embodiments are described in a progressive manner. The same or similar parts of every embodiment can be referred to each other. Each embodiment focuses on differences from the other embodiments. In particular, for any device or system embodiment, since it is basically similar to its corresponding method embodiment, the description is relatively simple. Please refer to the corresponding description of the method embodiment for relevant parts. The above described device and system embodiments are only schematic, in which a unit described as separate component may or may not be physically individual, and the components displayed as a unit may or may not be a physical unit, that is, they may be located in a single place or may be distributed over multiple network units. Some or all of the modules can be further modified or improved according to actual needs to achieve a purpose of any embodiment. Those skilled in the art can do so with spirit of the present invention it without creative work.

The above description is only to the preferred embodiments of the present invention, but the scope of protection of the present invention is not limited to the disclosed embodiments. Any variant or alternative that can be easily done by those skilled in the art within the technical concept disclosed in the present invention should be covered by the scope of protection of the present invention. Therefore, the scope of protection of the present invention should be subject to the appended claims.

The invention claimed is:

1. A system for simultaneously measuring multiple DOF GEs by a laser, wherein the system comprises a measuring unit and a target mirror unit; the measuring unit comprising a means for emitting a laser, a polarizing beam splitter, a fixed reflector, a first $\lambda/4$ wave plate, a second $\lambda/4$ wave plate, a first polarizer, a first photodetector, a means for measuring an interference length, and a means for measuring a two-dimensional angle; the target mirror unit comprises a beam splitter and a reflector;

the means for emitting the laser is used to generate an emitting light L1;

the polarizing beam splitter is used for 1) "beam splitting" which comprises splitting the emitting light L1 into a measuring light L11 and a reference light L12; the measuring light L11 is incident on the target mirror unit, is transmitted by the beam splitter of the target mirror unit, and is reflected back by the reflector as a light L111; the light L111 carries a 3DOF LGE signal back to the measuring unit as a linear GE measuring light; the reference light L12 only propagates inside the measurement unit; 2) "beam combining" which comprises transmitting or reflecting the reference light L12 that passes by the polarizing beam splitter again and the measuring light L111 that is reflected back 180° toward its original direction by the target mirror unit according to its polarizing status, so that above two beams are superposed in a spatial position, so as to form a combined light L3; and 3) "beam separating" which separates the light L112 reflected by the beam splitter in the target mirror unit from the measuring light L11 as a two-dimensional angle measuring light, and the light L112 is transmitted or reflected by the polarizing beam splitter according to its polarizing state;

the fixed reflector is used for reflecting backward the reference light L12 propagating only within the measuring unit to return the reference light L12 to the polarizing beam splitter;

the first $\lambda/4$ wave plate is used to change a polarizing direction of the reference light L12, so that when the reference light L12 passes by the polarizing beam splitter again, its transmitting or reflecting status is switched, that is, the reference light L12 is reflected at the first pass, but is transmitted at the second pass; or is transmitted at the first pass, but is reflected at the second pass; the second $\lambda/4$ wave plate is used to change polarizing directions of the LGE measuring light L111 and a two-dimensional angle measuring light L112, so that when the LGE measuring light L111 and the two-dimensional angle measuring light L112 pass by the polarizing beam splitter again, their transmitting status or reflecting status is switched;

the first polarizer is arranged between the polarizing beam splitter and the first photodetector; as a light transmitting axial direction of the first polarizer is adjusted, the combined light L3 interferes after passing through the first polarizer;

the first photodetector is used to receive a superimposed light beam L3 including the reference light L12 and the measuring light L111, so as to simultaneously measure LGEs along X, Y and Z axes; specifically: 1) according to a spot offset of the LGE measuring light L111 on the first photodetector, calculating a relative straightness error between the target mirror unit and the measuring unit along Y axis or Z axis; and 2) cooperating with the means for measuring the interference length to measure a relative position error between the target mirror unit and the measuring unit along X-axis;

the means for measuring the two-dimensional angle includes a focusing lens or lens group, and a second photodetector; the focusing lens or lens group is used to focus the two-dimensional angle measuring light L112 on the second photodetector; and the two-dimensional relative angle error between the target mirror unit and the measuring unit resulted from rotating about Y-axis and Z-axis is calculated according to a spot offset on the second photodetector;

the beam splitter in the target mirror unit is used to split the measuring light L11, in which a transmitted light L111 is reflected back by the reflector in the target mirror unit and returns to the measuring unit with straightness and positioning error information; while a reflected light L112 carries the two-dimensional angle information back to the measuring unit; and the reflector in the target mirror unit is used to reflect the measuring light L111 back 180° toward its original direction and return the measuring light L111 to the polarizing beam splitter, so as to result in: 1) changing a spatial position of the measuring light L111 along Y-axis and/or Z-axis, its spatial offset is twice the relative displacement between the reflector in the target mirror unit and the measuring unit along Y axis and/or Z-axis; and 2) changing an optical path and frequency of the measuring light L111, and a drift of the optical path and frequency is directly proportional to a relative displacement between the reflector in the target mirror unit and the measuring unit along X-axis.

2. The system according to claim 1, wherein the means for emitting the laser emits a single frequency laser, and the means for measuring the interference length includes a first non-polarizer beam splitter, a phase retarder, and a third photodetector;

the first non-polarizer beam splitter is arranged between the first polarizer and the first photodetector, and is used to split the interference light, in which one beam is received by the first photodetector, while the other beam is received by the third photodetector; light intensities of interference spots on the first photodetector and the third photodetector are $I_1$, $I_3$, respectively; and the phase retarder is arranged in front of the first photodetector or the third photodetector, so as to make a phase difference 90° between the interference spot signals $I_1$, $I_3$ detected by the two photodetectors; a phase difference $\varphi(\Delta x)$ between the reference light L12 and the measuring light L111 is calculated; and a relative displacement $\Delta x$ between the target mirror unit and the measuring unit along X-axis is calculated according to the phase difference.

3. The system according to claim 1, wherein the means for emitting the laser generates a dual frequency laser; the means for measuring the interference length comprises a third non-polarizing beam splitter, a second polarizer, and a fourth photodetector;

the dual frequency laser is a polarized light with two beams; the two beams are spatially superposed, with a certain frequency difference, and with different polarizing directions;

the third non-polarizing beam splitter is disposed between the means for emitting the laser and the polarizing beam splitter, and the means for emitting the laser emitting light L1 is split by the third non-polarizing beam splitter, to form another laser beam L2;

the second polarizer is arranged between the third non-polarizer beam splitter and the fourth photodetector; by adjusting a light transmitting axial direction of the second polarizer, the laser light L2 interferes after passing through the second polarizer; and an interference spot is received by the fourth photodetector as a reference signal/standard signal for heterodyne interference length measurement; and the combined light L3 interferes after passing through the first polarizer; and the interference spot is received by the first photodetector as a measuring signal of the heterodyne interference length measurement; according to the reference signal/standard signal and the measuring signal, a relative displacement between the target mirror unit and the measuring unit along X-axis is calculated.

4. The system according to claim 1, wherein the means for emitting the laser comprises a multi wavelength laser light source and a means for generating a heterodyne frequency, the means for measuring the interference length comprises a 1st band-pass filter to an Nth band-pass filter and a 1st phase detector to an Nth phase detector, where Nis a natural number greater than or equal to 3; and the polarization beam splitter is replaced with a second non-polarizing beam splitter;

the multi wavelength laser light source emits multi wavelength laser lights $\lambda_1, \lambda_2, \lambda_3, \ldots, \lambda_N$; their frequencies are $v_1, v_2, v3, \ldots, v_N$; after passing through the means for generating the heterodyne frequency, frequencies of the multi wavelength laser become $v_1+f_1, v_2+f_2, v_3+f_3, \ldots, v_N+f_N$, wherein the multi wavelength laser light is the emitting light L1; the second non-polarizing beam splitter is used for 1) "beam splitting" which comprises splitting the emitting light L1 into a measuring light L11 and a reference light L12, the measuring light L11 is incident on the target mirror unit and is reflected back by the target mirror unit as a light L111; the L111 carries a 3DOF LGE signal to return to the measuring unit as a measuring light, and the reference light L12 only propagates within the measurement unit; 2) "beam combining" which comprises transmitting or reflecting the reference light L12 that passes by the non-polarizing beam splitter again and the measuring light L111 reflected by the target mirror unit, so that above two beams are superposed in a spatial position, so as to form a combined beam L3; and 3) "beam separating" which separates a light L112 reflected by the beam splitter in the target mirror unit from the measuring light L11 as a two-dimensional angle measuring light;

the combined light L3 interferes on the first photodetector, and an obtained heterodyne interference signal spectrum only contains components $f_1, f_2, f_3, \ldots, f_N$; and after the 1st band-pass filter to the Nth bandpass filter separate the components $f_1, f_2, f_3, \ldots, f_N$, the 1st phase detector to the Nth phase detector measure ranging phase information $\varphi_1, \varphi_2, \varphi_3, \ldots, \varphi_N$ corresponding to each wavelength; taking n pairs of components to form a series of beat signals, in which $2 \leq n \leq N-1$, n is a natural number; and a relative displacement $\Delta x$ between the target mirror unit and the measuring unit along X-axis is calculated according to n pairs of wavelengths and n pairs of phase differences.

5. The system according to claim 1, wherein the means for emitting the laser emits a single frequency laser, and a second non-polarizing beam splitter is used to replace the polarizing beam splitter, and the means for measuring the interference length includes a first non-polarizing beam splitter, a phase retarder, and a third photodetector;

the second non-polarizing beam splitter is used for 1) "beam splitting" which comprises splitting an emitting light L1 into a measuring light L11 and a reference light L12, the measuring light L11 is incident on the target mirror unit and is reflected back by the target mirror unit as a measuring light L111 which carries a 3DOF LGE signal to return to the measuring unit as a measuring light, and the reference light L12 only propagates within the measuring unit; 2) "beam combining" which comprises transmitting or reflecting the reference light L12 that passes by the non-polarizing beam splitter again and the light L111 reflected by the target mirror unit, so that above two beams are superposed in a spatial position, so as to form a combined light L3; the combined light L3 is a superimposed beam of the reference light L12 transmitted by the non-polarizing beam splitter and the measuring light L111 reflected by the non-polarizing beam splitter, or a superimposed beam of the reference light L12 reflected by the non-polarizing beam splitter and the measuring light L111 transmitted by the non-polarizing beam splitter; and 3) "beam separating" which separates a light L112 reflected by the beam splitter in the target mirror unit from the measuring light L11 as a two-dimensional angle measuring light;

the first non-polarizer beam splitter is arranged between the first polarizer and the first photodetector, and is used to split the combined beam L3 that has been interfered, in which one beam L31 is received by the first photodetector, while the other beam L32 is received by the third photodetector; light intensities of interference spots on the first photodetector and the third photodetector are $I_1, I_3$, respectively; and the phase retarder is arranged in front of the first photodetector or the third photodetector, so as to make a phase difference 90° between interference spot signals $I_1, I_3$ detected by the two photodetectors; a phase difference q $(\Delta x)$ between the reference light L12 and the measuring light L111 is calculated; and a relative displacement $\Delta x$ between the target mirror unit and the measuring unit along X-axis is calculated according to the phase difference.

6. The system according to claim 1, in which a rolling angle measuring is added so as to simultaneously measure 6DOF GEs, wherein adding a third $\lambda/4$ wave plate at the target mirror unit end, so that the measuring light L111 passes by the third $\lambda/4$ wave plate to return to the measuring unit, passing through the second $\lambda/4$ wave plate, and passing by the polarizing beam splitter again, then the measuring light L111 is divided, in which one beam L111' is received by the first photodetector, while the other beam L111" is received by the fifth photodetector; and when measuring, the third $\lambda/4$ wave plate makes a relative angle offset y and a polarizing direction rotated angle $\gamma'$ of the measuring light L111 as the target mirror unit and the measuring unit rotates about X-axis; light intensities received by the first photodetector and the fifth photodetector varies with the angle $\gamma'$; according to the measured light intensity changes of the first photodetector and the fifth photodetector, a relationship between the light intensity changes and said angle $\gamma'$, and said angle $\gamma'$ which is directly proportional to the angle $\gamma$, a relative angle change, i.e., a rolling angle $\gamma$, between the target mirror unit and the measuring unit about X-axis is obtained.

7. The system according to claim 1, wherein the fixed reflector is selected from a group comprising of a corner cube prism, a cat's eye mirror, a corner cube retroreflector composed of three mutually perpendicular reflecting surfaces, a right angle prism, and a retroreflector composed of two plane mirrors; and the target mirror unit reflector is selected from a group comprising of a corner cube prism, a cat's eye mirror, and an angular cube retroreflector composed of three mutually perpendicular reflecting surfaces.

8. The system according to claim 1, wherein the first photodetector, the second photodetector, a third photodetector and a fifth photodetector are any one of QD, PSD, CCD and CMOS; and according to a spot offset on any one of the first photodetector, the third photodetector and the fifth photodetector, a relative straightness error between the target mirror unit and the measuring unit along Y-axis or Z-axis is calculated; and a fourth photodetector is any one of QD, PSD, CCD, CMOS and Pin Detector.

9. A method for simultaneously measuring 5DOF GEs by a laser, wherein the method is applied to the system according to claim 1, and the method comprises the following steps:

1) measuring a straightness error along Y-axis or Z-axis based on laser collimation principle or called laser autocollimation 1.1) when an emitting light L1 emitted by a means for emitting a laser passes by a polarizing beam splitter, it is divided into a measuring light L11 and a reference light or a standard light L12;

1.2) after the measuring light L11 is emitted from the measuring unit, the measuring light L11 enters the target mirror unit, and is divided by a beam splitter of the target mirror unit, in which a transmitted light L111 is reflected back 180° toward its original direction by a reflector of the target mirror unit, a spatial position of the light L111 is changing being changed with a relative straightness error between the target mirror unit and the measuring unit along Y-axis or Z-axis; the light L111 carries two-dimensional straightness error information back to the measurement unit; and the light L111 passes by the polarizing beam splitter again;

1.3) after the reference light L12 is reflected back 180° toward its original direction by the fixed reflector, it passes by the polarizing beam splitter again, and is combined with the light L111 passing by the polarizing beam splitter again in Step 1.2), so as to form a combined light L3 which is received by the first photodetector;

1.4) recording an initial position of a spot of the combined light measured by the first photodetector; and 1.5) according to a real-time position of the spot of the combined light on the first photodetector, comparing the real-time position with the initial position of the spot of the combined light, to obtain an offset of the spot of the combined light; since the offset of the spot of the combined light is only resulted from a position drift of the measuring light L111, a relative straightness error between the target mirror unit and the measuring unit along Y-axis or Z-axis is calculated according to the position offset of the spot of the combined light;

2) measuring a position error along X-axis based on laser interference 2.1) after the reference light L12 in Step 1.1) is reflected back 180° toward its original direction by the fixed reflector of the measuring unit, its polarizing state, frequency and phase are kept as what they are, so the light L12 is used as a reference light of the interference length measuring signal;

2.2) frequency and phase of the light L111 in Step 1.2) keep changing with a relative displacement between the target mirror unit and the measuring unit along X-axis, so the light L111 carries straightness error information along X-axis to return to the measuring unit as a measuring light of a heterodyne interference length measuring signal; and 2.3) after the reference light L12 in Step 2.1) and the measuring light L111 in Step 2.2) pass through the polarizing beam splitter, above two beams are superposed in a space; after passing through the means for measuring the interference length, a relative displacement between the target mirror unit and the measuring unit along X-axis is calculated by referring to a signal measured on the first photodetector; and 3) measuring an angle error resulted from rotating around Y-axis or Z-axis based on laser collimation 3.1) the reflected light of the beam splitter of the target mirror unit in Step 1.2) is as a two-dimensional angle measuring light L112;

3.2) the light L112 carries the two-dimensional angle error information back to the measuring unit, and passes by the second $\lambda/4$ wave plate and the polarizing beam splitter, and focuses on a second photodetector by a focusing lens or lens group;

3.3) recording an initial position of a light spot measured by the second photodetector; and 3.4) according to a real-time position of the light spot on the second photodetector, comparing the same with its initial position of the light spot, so as to obtain a spot offset, and a two-dimensional relative angle error between the target mirror unit and the measuring unit resulted from rotating around Y-axis or Z-axis is calculated according to the spot offset.

10. The method according to claim 9, wherein calculating a straightness error along Y-axis or Z-axis according to a position offset of a spot of a combined light is as follows:

the initial position and the real-time position of the spot on the first photodetector are $(y1_0, z1_0)$, $(y1_t, z1_t)$, respectively, then relative straightness errors between the target mirror unit and the measuring unit along Y-axis and Z-axis are $\Delta y = 2(y1_t - y1_0)$, $\Delta z = 2(z1_t - z1_0)$, respectively.

11. The method according to claim 9, wherein when a single frequency length measurement is applied, the position error along X-axis based on laser interferometry comprises the following steps:

1) the reference light L12 and the measuring light L111 are superposed in a spatial position after passing by the polarizing beam splitter or a second non-polarizing beam splitter, and are denoted as a combined light L3; as a light transmitting axial direction of a first polarizer is adjusted, the combined light L3 interferes after passing through the first polarizer;

2) the interference light L3 is divided into a light L31 and a light L32 after passing by a first non-polarizing beam splitter;

3) one of the light L31 and the light L32 is delayed 90° by a phase retarder, then they are received by the first photodetector and a third photodetector, respectively, light intensities of interference spots thereon are $I_1$, $I_3$, respectively; and 4) processing the $I_1$, $I_3$, so as to obtain a phase difference $\varphi(\Delta x)$ between the reference light L12 and the measuring light L111, and a number $N(\Delta x)$ of light and dark changes of interference fringes caused by $\varphi(\Delta x)$; a laser emitting laser wavelength is $\lambda$, so a relative displacement between the target mirror unit and the measuring unit along X-axis is $\Delta x = N(\Delta x) \cdot \lambda/2$.

12. The method according to claim 9, wherein when a double frequency length measurement is performed, determining a position error along X-axis measured by laser interferometry comprises:

1) the emitting light L1 emitted from the means for emitting the laser contains two polarized lights with a certain frequency difference, the two polarized lights have frequencies $f_1$, $f_2$, respectively; when the emitting light L1 is split by the polarization beam splitter, a frequency of the measuring light L11 is $f_1$, while a frequency of the reference light L12 is $f_2$;

2) a relative displacement $\Delta x$ of the measuring light L111 along X-axis between the target mirror unit and the measuring unit is measured; a frequency variation due to Doppler effect is $f(\Delta x)$; and a frequency of the measuring light L111 is $f_1 + f(\Delta x)$;

3) setting a first polarizer in front of the first photodetector; by adjusting a light transmitting axial direction of the first polarizer, the linearly polarized light L12 and the light L111 interfere after passing by the first polarizer; an interference spot is received by the first photodetector as a measuring signal of a heterodyne interference length measurement, and a frequency of a measured beat signal is $f_m = f_1 + f(\Delta x) - f_2$;

4) when the emitting light L1 passes by a third non-polarizing beam splitter, it is split by the third non-polarizing beam splitter to form another laser beam L2; as a light transmitting axial direction of a second polarizer is adjusted, the light L2 interferes after passing through the second polarizer; an interference spot is received by the fourth photodetector as a standard signal for the heterodyne interference length measurement, and a frequency of the standard signal is $f_s = f_1 - f_2$; and 5) the frequency of the measured beat signal obtained in Step 3), $f_m=f_1+f(\Delta x)-f_2$, subtracts the standard beat signal frequency obtained in Step 4), $f_s=f_1-f_2$, so as to obtain $f(\Delta x)=f_m-f_s$; a number of light and dark changes of interference fringes caused by $f(\Delta x)$ is $N(\Delta x)$, and a laser emitting laser wavelength is $\lambda$, so that a relative displacement between the target mirror unit and the measuring unit along X-axis is $\Delta x=N(\Delta x)\cdot\lambda/2$.

13. The method according to claim 9, wherein when measuring a length of multiple wavelengths, determining a position error along X-axis based on laser interferometry comprises the following steps:

1) the multi wavelength laser light source emits multi wavelength laser lights $\lambda_1, \lambda_2, \lambda_3, \ldots, \lambda_N$; their frequencies are $v_1, v_2, v_3, \ldots, v_N$; after passing through the means for measuring the heterodyne frequency, the frequencies of the multi wavelength laser become $v_1+f_1, v_2+f_2, v_3+f_3, \ldots, v_N+f_N$, the multi wavelength laser light is the emitting light L1;

2) the emitting light L1 is split into a measuring light L11 and a reference light L12 by a second non-polarizing beam splitter, and the measuring light L11 and the reference light L12 both contain multi wavelength laser light $v_1+f_1, v_2+f_2, v_3+f_3, \ldots, v_N+f_N$;

3) the measuring light L11 is emitted from the measuring unit and enters the target mirror unit, and is reflected back 180° toward its original direction by the reflector of the target mirror unit; a retroreflected light is a light L111 which carries straightness error information along X-axis and returns to the measuring unit as a measuring light of the heterodyne interference length measuring signal;

4) after the reference light L12 is reflected back 180° toward its original direction by the fixed reflector of the measuring unit, it passes by the non-polarizing beam splitter, and then combines with the light L111; by adjusting a light transmitting axial direction of a first polarizer, the reference light L12 and the measuring light L111 interfere with each other on the first photodetector; and 5) the first photodetector detects components, such as $f_1$, $f_2$, $f_3$, $\ldots$, $f_N$, of the heterodyne interference signal spectrum; the 1st band-pass filter to the Nth band-pass filter separate the components such as $f_1, f_2, f_3, \ldots, f_N$; the 1st phase detector to the Nth phase detector measure ranging phase information $\varphi_1, \varphi_2, \varphi_3, \ldots, \varphi_N$ corresponding to each wavelength; taking n pairs thereof to form a series of beat signals, a relative displacement $\Delta x$ between the target mirror unit and the measuring unit along X-axis is calculated according to n pairs of combined wavelengths and of n pairs phase differences.

14. The method according to claim 9, wherein calculating a two-dimensional angle error resulted from rotating about Y-axis or Z-axis according to a spot offset is as follows:

an initial position and a real-time position of the light L112's spot on the second photodetector are $(y_0, z_0)$, $(y_t, z_t)$, respectively, relative angle errors between the target mirror unit and the measuring unit resulted from rotating around Y-axis and Z-axis are $\Delta\alpha=(y_t-y_0)/2f$, $\Delta\beta=(z_t-z_0)/2f$, respectively, where f is a focal length of a focusing lens or lens group.

15. The method according to claim 9, wherein for measuring a rolling angle with a single frequency length measurement, a third $\lambda/4$ wave plate is added in the target mirror unit to measure an angular error resulted from rotating around X-axis, i.e., to measure 6DOF GEs, said method comprises the following steps:

1) adding a third $\lambda/4$ wave plate in the target mirror unit, the measuring light L111 passes by the third $\lambda/4$ wave plate to return to the measuring unit, then passing through the second $\lambda/4$ wave plate, the measuring light L111 is split again when passing through the polarizing beam splitter, in which one beam L111' is received by the first photodetector and a third photodetector, while the other beam L111'' is received by the fifth photodetector;

2) blocking the measuring light L111, so that only the reference light L12 is received on the first photodetector and the third photodetector, and recording light intensities $I_{10}$, $I_{30}$ of the first photodetector and the third photodetector, respectively;

3) recovering the measuring light L111; with the third $\lambda/4$ wave plate, making a variation $\gamma$ of a relative angle between the target mirror unit and the measuring unit around X-axis; when the measuring light passes by the polarizing beam splitter again, its polarizing direction increases $\gamma'$ with respect to its original polarizing direction, $\gamma'$ is in a direct proportion to $\gamma$; $\gamma'=k_1\gamma$; when the measuring light passes by the second $\lambda/4$ wave plate in the target mirror unit for the first time, $k_1=1$; when the measuring light passes by the second $\lambda/4$ wave plate in the target mirror unit for the second time, $k_1=2$;

4) the measuring light L111 passes by the polarizing beam splitter and is split by the polarizing beam splitter, in which one beam is received by the first photodetector and the third photodetector, light intensities thereon are $I_1(\gamma), I_3(\gamma)$, while the other beam is received by the fifth photodetector with a light intensity thereon $I_5(\gamma)$, there is formed a function $f(\gamma)=[I_1(\gamma)-I_{10}+I_3(\gamma)-I_{30}-I_5(\gamma)]/[I_1(\gamma)-I_{10}+I_3(\gamma)-I_{30}+I_5(\gamma)]$;

5) turning the target mirror unit around X-axis by several specific angles $\gamma_1, \gamma_2, \ldots$, measuring the corresponding $f(\gamma_1), f(\gamma_2), \ldots$, and calibrating a function curve of $f(\gamma)$ v·$\gamma$; and 6) measuring light intensities $I_1(\gamma), I_3(\gamma), I_5(\gamma)$ in real time, calculating $f(\gamma)$ according to Step 4); calculating a relative rotation angle $\gamma$ between the target mirror unit and the measuring unit about X-axis according to a calibrated function $f(\gamma)$v·$\gamma$ in Step 5).

16. The method according to claim 9, wherein for measuring a rolling angle with a dual frequency length measurement, a third $\lambda/4$ wave plate is added in the target mirror unit to measure an angular error resulted from rotating around X-axis, the method comprises the following steps:

1) adding a third $\lambda/4$ wave plate in the target mirror unit, the measuring light L111 passes by the third $\lambda/4$ wave plate to return to the measuring unit; after passing by the second $\lambda/4$ wave plate, the measuring light L111 is split again when passing by the polarizing beam splitter, in which one beam L111' is received by the first photodetector, while the other beam L111'' is received by the fifth photodetector;

2) blocking the measuring light L111, so that only the reference light L12 is received on the first photodetector, and recording a light intensity $I_{10}$ of the first photodetector;

3) recovering the measuring light L111; with the third $\lambda/4$ wave plate, a relative angle variation $\gamma$ is made between the target mirror unit and the measuring unit around X-axis; when the measuring light passes by the polarizing beam splitter again, its polarizing direction increases by $\gamma'$ with respect to its original polarizing direction, $\gamma'$ is in a direct proportion to $\gamma$; $\gamma'=k_1\gamma$; when the measuring light passes by the second $\lambda/4$ wave plate in the target mirror unit for the first time, $k_1=1$; when the measuring light passes by the second $\lambda/4$ wave plate in the target mirror unit for the second time, $k_1=2$;

4) the measuring light L111 passes by the polarizing beam splitter and is split by the polarizing beam splitter, in which one beam is received by the first photodetector and its light intensity is $I_1(\gamma)$, while the other beam is received by the fifth photodetector, and its light intensity is $I_5(\gamma)$, $f(\gamma)=[I_1(\gamma)-I_{10}-I_5(\gamma)]/[I_1(\gamma)-I_{10}+I_5(\gamma)]$;

5) turning the target mirror unit around X-axis by several specific angles $\gamma_1, \gamma_2, \ldots$, measuring the corresponding $f(\gamma_1)$, $f(\gamma_2)$, $\ldots$, and calibrating a functional curve of $f(\gamma)v\cdot\gamma$; and 6) measuring light intensities $I_1(\gamma)$, $I_5(\gamma)$ in real time; calculating $f(\gamma)$ according to Step 4); and calculating a rotation angle $\gamma$ of the target mirror unit about X-axis according to the functional curve of $f(\gamma)v\cdot\gamma$ calibrated in Step 5).

* * * * *